US008856349B2

(12) United States Patent
Jain et al.

(10) Patent No.: US 8,856,349 B2
(45) Date of Patent: *Oct. 7, 2014

(54) CONNECTION PRIORITY SERVICES FOR DATA COMMUNICATION BETWEEN TWO DEVICES

(75) Inventors: Vikal Kumar Jain, Bangalore (IN); Parimal Bajpai, Bangalore (IN); Satish Iyer, Bangalore (IN); Ilya Asnis, San Jose, CA (US); Vikram Dham, Fremont, CA (US)

(73) Assignees: Sling Media Inc., Foster City, CA (US); Sling Media PVT Ltd, Bangalore (IN)

( * ) Notice: Subject to any disclaimer, the term of this patent is extended or adjusted under 35 U.S.C. 154(b) by 356 days.

This patent is subject to a terminal disclaimer.

(21) Appl. No.: 12/753,641

(22) Filed: Apr. 2, 2010

(65) Prior Publication Data

US 2011/0196521 A1    Aug. 11, 2011

(30) Foreign Application Priority Data

Feb. 5, 2010 (IN) .............................. 300/CHE/2010

(51) Int. Cl.
*G06F 15/16* (2006.01)
*H04J 3/00* (2006.01)
*H04J 3/16* (2006.01)
*H04L 29/06* (2006.01)
*H04L 29/08* (2006.01)
*H04W 76/02* (2009.01)
*H04L 12/28* (2006.01)

(52) U.S. Cl.
CPC ............... *H04L 67/16* (2013.01); *H04L 69/24* (2013.01); *H04L 67/141* (2013.01); *H04L 67/14* (2013.01); *H04W 76/02* (2013.01); *H04L 12/281* (2013.01)
USPC ........... 709/227; 709/201; 709/204; 709/218; 709/228; 709/230; 370/464; 370/466

(58) Field of Classification Search
CPC ... H04L 67/32; H04L 67/322; H04L 67/1008; H04L 67/1029; H04L 5/0064; H04L 5/1438; H04L 41/0803; H04L 41/5009; H04L 29/06176; H04L 29/06197; H04L 29/06319; H04L 29/06523; H04L 29/08171; H04L 12/1822; H04L 12/4013
USPC ................. 709/201, 204, 218, 227–228, 230; 370/464, 466
See application file for complete search history.

(56) References Cited

U.S. PATENT DOCUMENTS 3,416,043 A    12/1968  Jorgensen
4,254,303 A     3/1981  Takizawa
(Continued)

FOREIGN PATENT DOCUMENTS

CN    1464685 A    12/2003
DE    4407319 A1    9/1994
(Continued)

OTHER PUBLICATIONS

Lee, M. et al. "Video Frame Rate Control for Non-Guaranteed Network Services with Explicit Rate Feedback," Globecom'00, 2000 IEEE Global Telecommunications conference, San Francisco, CA, Nov. 27-Dec. 1, 2000; [IEEE Global Telecommunications Conference], New York, NY; IEEE, US, vol. 1,Nov. 27, 2000, pp. 293-297, XP001195580; ISBN: 978-0-7803-6452-3, lines 15-20 of sec. II on p. 293, fig. 1.

(Continued)

*Primary Examiner* — David Lazaro
*Assistant Examiner* — Farzana Huq
(74) *Attorney, Agent, or Firm* — Ingrassia Fisher & Lorenz, P.C.

(57) ABSTRACT

A digital media player device includes, without limitation, a processor and a communication module coupled to the processor and configured to support data communication with a digital media place-shifting device. The processor and the communication module cooperate to attempt to establish data communication with the digital media place-shifting device in accordance with a connection mode sequence that identifies a plurality of different data communication modes supported by the digital media player device, until one of the plurality of different data communication modes can be used to initiate a data communication session between the digital media player device and the digital media place-shifting device. The processor and the communication module also cooperate to perform data communication with the digital media place-shifting device, using the one of the plurality of different data communication modes.

4 Claims, 5 Drawing Sheets

(56) References Cited

U.S. PATENT DOCUMENTS

| | | |
|---|---|---|
| 5,161,021 A | 11/1992 | Tsai |
| 5,237,648 A | 8/1993 | Mills et al. |
| 5,386,493 A | 1/1995 | Degen et al. |
| 5,434,590 A | 7/1995 | Dinwiddie, Jr. et al. |
| 5,493,638 A | 2/1996 | Hooper et al. |
| 5,602,589 A | 2/1997 | Vishwanath et al. |
| 5,661,516 A | 8/1997 | Carles |
| 5,666,426 A | 9/1997 | Helms |
| 5,682,195 A | 10/1997 | Hendricks et al. |
| 5,706,290 A | 1/1998 | Shaw et al. |
| 5,708,961 A | 1/1998 | Hylton et al. |
| 5,710,605 A | 1/1998 | Nelson |
| 5,722,041 A | 2/1998 | Freadman |
| 5,757,416 A | 5/1998 | Birch et al. |
| 5,774,170 A | 6/1998 | Hite et al. |
| 5,778,077 A | 7/1998 | Davidson |
| 5,794,116 A | 8/1998 | Matsuda et al. |
| 5,822,537 A | 10/1998 | Katseff et al. |
| 5,831,664 A | 11/1998 | Wharton et al. |
| 5,850,482 A | 12/1998 | Meany et al. |
| 5,852,437 A | 12/1998 | Wugofski et al. |
| 5,880,721 A | 3/1999 | Yen |
| 5,898,679 A | 4/1999 | Brederveld et al. |
| 5,909,518 A | 6/1999 | Chui |
| 5,911,582 A | 6/1999 | Redford et al. |
| 5,922,072 A | 7/1999 | Hutchinson et al. |
| 5,936,968 A | 8/1999 | Lyons |
| 5,958,053 A * | 9/1999 | Denker ............................. 726/1 |
| 5,968,132 A | 10/1999 | Tokunaga |
| 5,987,501 A | 11/1999 | Hamilton et al. |
| 6,002,450 A | 12/1999 | Darbee et al. |
| 6,008,777 A | 12/1999 | Yiu |
| 6,014,694 A | 1/2000 | Aharoni et al. |
| 6,020,880 A | 2/2000 | Naimpally |
| 6,031,940 A | 2/2000 | Chui et al. |
| 6,036,601 A | 3/2000 | Heckel |
| 6,040,829 A | 3/2000 | Croy et al. |
| 6,043,837 A | 3/2000 | Driscoll, Jr. et al. |
| 6,049,671 A | 4/2000 | Slivka et al. |
| 6,075,906 A | 6/2000 | Fenwick et al. |
| 6,088,777 A | 7/2000 | Sorber |
| 6,097,441 A | 8/2000 | Allport |
| 6,104,334 A | 8/2000 | Allport |
| 6,108,041 A | 8/2000 | Faroudja et al. |
| 6,115,420 A | 9/2000 | Wang |
| 6,117,126 A | 9/2000 | Appelbaum et al. |
| 6,141,059 A | 10/2000 | Boyce et al. |
| 6,141,447 A | 10/2000 | Linzer et al. |
| 6,160,544 A | 12/2000 | Hayashi et al. |
| 6,201,536 B1 | 3/2001 | Hendricks et al. |
| 6,212,282 B1 | 4/2001 | Mershon |
| 6,222,885 B1 | 4/2001 | Chaddha et al. |
| 6,223,211 B1 | 4/2001 | Hamilton et al. |
| 6,240,459 B1 | 5/2001 | Roberts et al. |
| 6,240,531 B1 | 5/2001 | Spilo et al. |
| 6,243,596 B1 | 6/2001 | Kikinis |
| 6,256,019 B1 | 7/2001 | Allport |
| 6,263,503 B1 | 7/2001 | Margulis |
| 6,279,029 B1 | 8/2001 | Sampat et al. |
| 6,282,714 B1 | 8/2001 | Ghori et al. |
| 6,286,142 B1 | 9/2001 | Ehreth |
| 6,308,205 B1 | 10/2001 | Carcerano et al. |
| 6,310,886 B1 | 10/2001 | Barton |
| 6,335,966 B1 | 1/2002 | Toyoda |
| 6,340,994 B1 | 1/2002 | Margulis et al. |
| 6,353,885 B1 | 3/2002 | Herzi et al. |
| 6,356,533 B1 | 3/2002 | Bruno et al. |
| 6,356,945 B1 | 3/2002 | Shaw et al. |
| 6,357,021 B1 | 3/2002 | Kitagawa et al. |
| 6,370,688 B1 | 4/2002 | Hejna, Jr. |
| 6,389,467 B1 | 5/2002 | Eyal |
| 6,434,113 B1 | 8/2002 | Gubbi |
| 6,442,067 B1 | 8/2002 | Chawala et al. |
| 6,456,340 B1 | 9/2002 | Margulis |
| 6,466,623 B1 | 10/2002 | Youn et al. |
| 6,470,378 B1 | 10/2002 | Tracton et al. |
| 6,476,826 B1 | 11/2002 | Plotkin et al. |
| 6,487,319 B1 | 11/2002 | Chai |
| 6,493,874 B2 | 12/2002 | Humpleman |
| 6,496,122 B2 | 12/2002 | Sampsell |
| 6,505,169 B1 | 1/2003 | Bhagavath et al. |
| 6,510,177 B1 | 1/2003 | De Bonet et al. |
| 6,529,506 B1 | 3/2003 | Yamamoto et al. |
| 6,553,147 B2 | 4/2003 | Chai et al. |
| 6,557,031 B1 | 4/2003 | Mimura et al. |
| 6,564,004 B1 | 5/2003 | Kadono |
| 6,567,984 B1 | 5/2003 | Allport |
| 6,584,201 B1 | 6/2003 | Konstantinou et al. |
| 6,584,559 B1 | 6/2003 | Huh et al. |
| 6,597,375 B1 | 7/2003 | Yawitz |
| 6,598,159 B1 | 7/2003 | McAlister et al. |
| 6,600,838 B2 | 7/2003 | Chui |
| 6,609,253 B1 | 8/2003 | Swix et al. |
| 6,611,530 B1 | 8/2003 | Apostolopoulos |
| 6,628,716 B1 | 9/2003 | Tan et al. |
| 6,642,939 B1 | 11/2003 | Vallone et al. |
| 6,647,015 B2 | 11/2003 | Malkemes et al. |
| 6,658,019 B1 | 12/2003 | Chen et al. |
| 6,665,751 B1 | 12/2003 | Chen et al. |
| 6,665,813 B1 | 12/2003 | Forsman et al. |
| 6,697,356 B1 | 2/2004 | Kretschmer et al. |
| 6,701,380 B2 | 3/2004 | Schneider et al. |
| 6,704,678 B2 | 3/2004 | Minke et al. |
| 6,704,847 B1 | 3/2004 | Six et al. |
| 6,708,231 B1 | 3/2004 | Kitagawa |
| 6,718,551 B1 | 4/2004 | Swix et al. |
| 6,754,266 B2 | 6/2004 | Bahl et al. |
| 6,754,439 B1 | 6/2004 | Hensley et al. |
| 6,757,851 B1 | 6/2004 | Park et al. |
| 6,757,906 B1 | 6/2004 | Look et al. |
| 6,766,376 B2 | 7/2004 | Price |
| 6,768,775 B1 | 7/2004 | Wen et al. |
| 6,771,828 B1 | 8/2004 | Malvar |
| 6,774,912 B1 | 8/2004 | Ahmed et al. |
| 6,781,601 B2 | 8/2004 | Cheung |
| 6,785,700 B2 | 8/2004 | Maasud et al. |
| 6,795,638 B1 | 9/2004 | Skelley, Jr. |
| 6,798,838 B1 | 9/2004 | Ngo |
| 6,806,909 B1 | 10/2004 | Radha et al. |
| 6,807,308 B2 | 10/2004 | Chui et al. |
| 6,816,194 B2 | 11/2004 | Zhang et al. |
| 6,816,858 B1 | 11/2004 | Coden et al. |
| 6,826,242 B2 | 11/2004 | Ojard et al. |
| 6,834,123 B2 | 12/2004 | Acharya et al. |
| 6,839,079 B2 | 1/2005 | Barlow et al. |
| 6,847,468 B2 | 1/2005 | Ferriere |
| 6,850,571 B2 | 2/2005 | Tardif |
| 6,850,649 B1 | 2/2005 | Malvar |
| 6,868,083 B2 | 3/2005 | Apostolopoulos et al. |
| 6,889,385 B1 | 5/2005 | Rakib et al. |
| 6,892,359 B1 | 5/2005 | Nason et al. |
| 6,898,583 B1 | 5/2005 | Rising, III |
| 6,907,602 B2 | 6/2005 | Tsai et al. |
| 6,927,685 B2 | 8/2005 | Wathen |
| 6,930,661 B2 | 8/2005 | Uchida et al. |
| 6,941,575 B2 | 9/2005 | Allen |
| 6,944,880 B1 | 9/2005 | Allen |
| 6,952,595 B2 | 10/2005 | Ikedo et al. |
| 6,981,050 B1 | 12/2005 | Tobias et al. |
| 7,016,337 B1 | 3/2006 | Wu et al. |
| 7,020,892 B2 | 3/2006 | Levesque et al. |
| 7,032,000 B2 | 4/2006 | Tripp |
| 7,047,305 B1 | 5/2006 | Brooks et al. |
| 7,110,558 B1 | 9/2006 | Elliott |
| 7,124,366 B2 | 10/2006 | Foreman et al. |
| 7,151,575 B1 | 12/2006 | Landry et al. |
| 7,155,734 B1 | 12/2006 | Shimomura et al. |
| 7,155,735 B1 | 12/2006 | Ngo et al. |
| 7,184,433 B1 | 2/2007 | Oz |
| 7,224,323 B2 | 5/2007 | Uchida et al. |
| 7,239,800 B2 | 7/2007 | Bilbrey |
| 7,344,084 B2 | 3/2008 | Dacosta |
| 7,430,686 B1 | 9/2008 | Wang et al. |
| 7,464,396 B2 | 12/2008 | Hejna, Jr. |

(56) References Cited

U.S. PATENT DOCUMENTS

| | | | |
|---|---|---|---|
| 7,502,733 | B2 | 3/2009 | Andrsen et al. |
| 7,505,480 | B1 | 3/2009 | Zhang et al. |
| 7,565,681 | B2 | 7/2009 | Ngo et al. |
| 7,925,792 | B2 | 4/2011 | Tian |
| 8,059,600 | B2* | 11/2011 | Jung et al. ............... 370/331 |
| 8,060,909 | B2 | 11/2011 | Krikorian et al. |
| 2001/0021998 | A1 | 9/2001 | Margulis |
| 2001/0026382 | A1* | 10/2001 | Bourgart ............... 359/113 |
| 2002/0004839 | A1 | 1/2002 | Wine et al. |
| 2002/0010925 | A1 | 1/2002 | Kikinis |
| 2002/0012530 | A1 | 1/2002 | Bruls |
| 2002/0031333 | A1 | 3/2002 | Mano et al. |
| 2002/0046404 | A1 | 4/2002 | Mizutani |
| 2002/0053053 | A1 | 5/2002 | Nagai et al. |
| 2002/0080753 | A1 | 6/2002 | Lee |
| 2002/0090029 | A1 | 7/2002 | Kim |
| 2002/0103910 | A1* | 8/2002 | Le Lay et al. ............... 709/227 |
| 2002/0105529 | A1 | 8/2002 | Bowser et al. |
| 2002/0112247 | A1 | 8/2002 | Horner et al. |
| 2002/0122137 | A1 | 9/2002 | Chen et al. |
| 2002/0131497 | A1 | 9/2002 | Jang |
| 2002/0138843 | A1 | 9/2002 | Samaan et al. |
| 2002/0143973 | A1 | 10/2002 | Price |
| 2002/0147634 | A1 | 10/2002 | Jacoby et al. |
| 2002/0147687 | A1 | 10/2002 | Breiter et al. |
| 2002/0167458 | A1 | 11/2002 | Baudisch et al. |
| 2002/0188818 | A1 | 12/2002 | Nimura et al. |
| 2002/0191575 | A1 | 12/2002 | Kalavade et al. |
| 2003/0001880 | A1 | 1/2003 | Holtz et al. |
| 2003/0028873 | A1 | 2/2003 | Lemmons |
| 2003/0065915 | A1 | 4/2003 | Yu et al. |
| 2003/0093260 | A1 | 5/2003 | Dagtas et al. |
| 2003/0095791 | A1 | 5/2003 | Barton et al. |
| 2003/0115167 | A1 | 6/2003 | Sharif et al. |
| 2003/0159143 | A1 | 8/2003 | Chan |
| 2003/0187657 | A1 | 10/2003 | Erhart et al. |
| 2003/0192054 | A1 | 10/2003 | Birks et al. |
| 2003/0208612 | A1 | 11/2003 | Harris et al. |
| 2003/0231621 | A1 | 12/2003 | Gubbi et al. |
| 2004/0003406 | A1 | 1/2004 | Billmaier |
| 2004/0052216 | A1 | 3/2004 | Roh |
| 2004/0068334 | A1 | 4/2004 | Tsai et al. |
| 2004/0083301 | A1 | 4/2004 | Murase et al. |
| 2004/0100486 | A1 | 5/2004 | Flamini et al. |
| 2004/0103340 | A1 | 5/2004 | Sundareson et al. |
| 2004/0139047 | A1 | 7/2004 | Rechsteiner et al. |
| 2004/0162845 | A1 | 8/2004 | Kim et al. |
| 2004/0162903 | A1 | 8/2004 | Oh |
| 2004/0172410 | A1 | 9/2004 | Shimojima et al. |
| 2004/0205830 | A1 | 10/2004 | Kaneko |
| 2004/0212640 | A1 | 10/2004 | Mann et al. |
| 2004/0216173 | A1 | 10/2004 | Horoszowski et al. |
| 2004/0236844 | A1 | 11/2004 | Kocherlakota |
| 2004/0255249 | A1 | 12/2004 | Chang et al. |
| 2005/0021398 | A1 | 1/2005 | McCleskey et al. |
| 2005/0027821 | A1 | 2/2005 | Alexander et al. |
| 2005/0038981 | A1 | 2/2005 | Connor et al. |
| 2005/0044058 | A1 | 2/2005 | Matthews et al. |
| 2005/0050462 | A1 | 3/2005 | Whittle et al. |
| 2005/0053356 | A1 | 3/2005 | Mate et al. |
| 2005/0055595 | A1 | 3/2005 | Frazer et al. |
| 2005/0055702 | A1 | 3/2005 | Kopp et al. |
| 2005/0060759 | A1 | 3/2005 | Rowe et al. |
| 2005/0091346 | A1 | 4/2005 | Krishnaswami et al. |
| 2005/0097542 | A1 | 5/2005 | Lee |
| 2005/0114852 | A1 | 5/2005 | Chen et al. |
| 2005/0132351 | A1 | 6/2005 | Randall et al. |
| 2005/0138560 | A1 | 6/2005 | Lee et al. |
| 2005/0198584 | A1 | 9/2005 | Matthews et al. |
| 2005/0204046 | A1 | 9/2005 | Watanabe |
| 2005/0216851 | A1 | 9/2005 | Hull et al. |
| 2005/0227621 | A1 | 10/2005 | Katoh |
| 2005/0229118 | A1 | 10/2005 | Chiu et al. |
| 2005/0246369 | A1 | 11/2005 | Oreizy et al. |
| 2005/0251833 | A1 | 11/2005 | Schedivy |
| 2005/0283791 | A1 | 12/2005 | McCarthy et al. |
| 2005/0288999 | A1 | 12/2005 | Lerner et al. |
| 2006/0011371 | A1 | 1/2006 | Fahey |
| 2006/0031381 | A1 | 2/2006 | Van Luijt et al. |
| 2006/0050970 | A1 | 3/2006 | Gunatilake |
| 2006/0051055 | A1 | 3/2006 | Ohkawa |
| 2006/0095401 | A1 | 5/2006 | Krikorian et al. |
| 2006/0095471 | A1 | 5/2006 | Krikorian et al. |
| 2006/0095472 | A1 | 5/2006 | Krikorian et al. |
| 2006/0095942 | A1 | 5/2006 | Van Beek |
| 2006/0095943 | A1 | 5/2006 | Demircin et al. |
| 2006/0107226 | A1 | 5/2006 | Matthews et al. |
| 2006/0117371 | A1 | 6/2006 | Margulis |
| 2006/0146174 | A1 | 7/2006 | Hagino |
| 2006/0271697 | A1* | 11/2006 | Kruse et al. ............... 709/230 |
| 2006/0280157 | A1 | 12/2006 | Karaoguz et al. |
| 2006/0285538 | A1 | 12/2006 | Oommen |
| 2007/0003224 | A1 | 1/2007 | Krikorian et al. |
| 2007/0005783 | A1 | 1/2007 | Saint-Hillaire et al. |
| 2007/0022328 | A1 | 1/2007 | Tarra et al. |
| 2007/0074115 | A1 | 3/2007 | Patten et al. |
| 2007/0076604 | A1 | 4/2007 | Litwack |
| 2007/0168543 | A1 | 7/2007 | Krikorian et al. |
| 2007/0174478 | A1 | 7/2007 | Ryu et al. |
| 2007/0180485 | A1 | 8/2007 | Dua |
| 2007/0198532 | A1 | 8/2007 | Krikorian et al. |
| 2007/0234213 | A1 | 10/2007 | Krikorian et al. |
| 2007/0276865 | A1* | 11/2007 | Bodin et al. ............... 707/104.1 |
| 2007/0286596 | A1 | 12/2007 | Lonn |
| 2008/0019276 | A1 | 1/2008 | Takatsuji et al. |
| 2008/0021978 | A1* | 1/2008 | Maynard et al. ............... 709/217 |
| 2008/0037573 | A1 | 2/2008 | Cohen |
| 2008/0059533 | A1 | 3/2008 | Krikorian |
| 2008/0134267 | A1 | 6/2008 | Moghe et al. |
| 2008/0195744 | A1 | 8/2008 | Bowra et al. |
| 2008/0199150 | A1 | 8/2008 | Candelore |
| 2008/0256485 | A1 | 10/2008 | Krikorian |
| 2008/0294759 | A1 | 11/2008 | Biswas et al. |
| 2008/0307077 | A1 | 12/2008 | Langoulant et al. |
| 2008/0307456 | A1 | 12/2008 | Beetcher et al. |
| 2008/0307462 | A1 | 12/2008 | Beetcher et al. |
| 2008/0307463 | A1 | 12/2008 | Beetcher et al. |
| 2009/0074380 | A1 | 3/2009 | Boston et al. |
| 2009/0080448 | A1 | 3/2009 | Tarra et al. |
| 2009/0102983 | A1 | 4/2009 | Malone et al. |
| 2009/0103607 | A1 | 4/2009 | Bajpai et al. |
| 2009/0157697 | A1 | 6/2009 | Conway et al. |
| 2009/0177758 | A1 | 7/2009 | Banger et al. |
| 2009/0193100 | A1* | 7/2009 | Moradi et al. ............... 709/219 |
| 2009/0199248 | A1 | 8/2009 | Ngo et al. |
| 2009/0286543 | A1 | 11/2009 | Nath et al. |
| 2010/0001960 | A1 | 1/2010 | Williams |
| 2010/0005483 | A1 | 1/2010 | Rao |
| 2010/0064055 | A1 | 3/2010 | Krikorian et al. |
| 2010/0064332 | A1 | 3/2010 | Krikorian et al. |
| 2010/0070925 | A1 | 3/2010 | Einaudi et al. |
| 2010/0071076 | A1 | 3/2010 | Gangotri et al. |
| 2010/0088371 | A1 | 4/2010 | Xu et al. |
| 2010/0100915 | A1 | 4/2010 | Krikorian et al. |
| 2010/0124196 | A1* | 5/2010 | Bonar et al. ............... 370/329 |
| 2011/0019650 | A1 | 1/2011 | van Niekerk |

FOREIGN PATENT DOCUMENTS

| | | |
|---|---|---|
| DE | 10234920 | 2/2004 |
| EP | 0838945 A | 4/1998 |
| EP | 1077407 A1 | 2/2001 |
| EP | 1443766 A2 | 8/2004 |
| EP | 1691550 A | 8/2006 |
| EP | 1830558 A1 | 9/2007 |
| GB | 2307151 A | 5/1997 |
| JP | 2003046582 A | 2/2003 |
| JP | 2004015111 A | 1/2004 |
| KR | 20010211410 A | 8/2001 |
| KR | 19990082855 A | 2/2010 |
| WO | 0133839 A1 | 5/2001 |
| WO | 0147248 A2 | 6/2001 |
| WO | 0193161 A1 | 12/2001 |
| WO | 03026232 A1 | 3/2003 |

(56) References Cited

FOREIGN PATENT DOCUMENTS

| WO | 03052552 | A2 | 6/2003 |
|---|---|---|---|
| WO | 03098897 | A | 11/2003 |
| WO | 2004032511 | A1 | 4/2004 |
| WO | 2005050898 | A2 | 6/2005 |
| WO | 2006048758 | A2 | 5/2006 |
| WO | 2006064454 | A1 | 6/2006 |
| WO | 2006074110 | A | 7/2006 |
| WO | 2007027891 | A2 | 3/2007 |
| WO | 2007051156 | A2 | 5/2007 |
| WO | 2007141555 | A2 | 12/2007 |
| WO | 2007149466 | A2 | 12/2007 |
| WO | 2008024723 | A | 2/2008 |

OTHER PUBLICATIONS

European Patent Office, International Searching Authority, "International Search Report and Written Opinion," mailed Jun. 4, 2010 for International Application No. PCT/IN2009/000728, filed Dec. 18, 2009.
USPTO Non-Final Office Action mailed Jun. 23, 2010; U.S. Appl. No. 11/933,969, filed Nov. 1, 2007.
Korean Intellectual Property Office "Official Notice of Preliminary Rejection," issued Jun. 18, 2010; Korean Patent Application No. 10-2008-7021254.
Japan Patent Office "Notice of Grounds for Rejection (Office Action)," mailed May 25, 2010; Patent Application No. 2007-0268269.
China State Intellectual Property Office "First Office Action," issued Jul. 31, 2009, for Application No. 200580026825.X.
USPTO, Non-Final Office Action, mailed Aug. 4, 2009; U.S. Appl. No. 11/734,277, filed Apr. 12, 2007.
USPTO, Non-Final Office Action, mailed Jul. 31, 2009; U.S. Appl. No. 11/683,862, filed Mar. 8, 2007.
USPTO, Non-Final Office Action, mailed Aug. 5, 2009; U.S. Appl. No. 11/147,663, filed Jun. 7, 2005.
USPTO, Non-Final Office Action, mailed Sep. 3, 2009; U.S. Appl. No. 11/620,711, filed Jan. 7, 2007.
Nandury, Venkata Kishore "Adaptive Gain Control for Digital Audio Samples in a Media Stream," U.S. Appl. No. 12/507,971, filed Jul. 23, 2009.
Malode, Deepak Ravi "Remote Control and Method for Automatically Adjusting the Volume Output of an Audio Device," U.S. Appl. No. 12/550,145, filed Aug. 28, 2009.
Akella, Aparna Sarma "Systems and Methods for Event Programming Via a Remote Media Player," U.S. Appl. No. 12/537,057, filed Aug. 6, 2009.
Shah, Bhupendra Natwerlan et al. "Systems and Methods for Transcoding and Place Shifting Media Content," U.S. Appl. No. 12/548,130, filed Aug. 26, 2009.
Banger, Shashidhar et al. "Systems and Methods for Automatically Controlling the Resolution of Streaming Video Content," U.S. Appl. No. 12/537,785, filed Aug. 7, 2009.
Panigrahi, Biswaranjan "Home Media Aggregator System and Method," U.S. Appl. No. 12/538,681, filed Aug. 10, 2009.
Lucas, Brian et al. "Systems and Methods for Establishing Connections Between Devices Communicating Over a Network," U.S. Appl. No. 12/426,103, filed Apr. 17, 2009.
Shirali, Amey "Systems and Methods for Providing Programming Content," U.S. Appl. No. 12/538,676, filed Aug. 10, 2009.
Thiyagarajan, Venkatesan "Systems and Methods for Virtual Remote Control of Streamed Media," U.S. Appl. No. 12/538,664, filed Aug. 10, 2009.
Thiyagarajan, Venkatesan et al. "Localization Systems and Method," U.S. Appl. No. 12/538,783, filed Aug. 10, 2009.
Shirali, Amey et al. "Methods and Apparatus for Seeking Within a Media Stream Using Scene Detection," U.S. Appl. No. 12/538,784, filed Aug. 10, 2009.
Thiyagarajan, Venkatesan "Systems and Methods for Updating Firmware Over a Network," U.S. Appl. No. 12/538,661, filed Aug. 10, 2009.

Iyer, Satish "Methods and Apparatus for Fast Seeking Within a Media Stream Buffer," U.S. Appl. No. 12/538,659, filed Aug. 10, 2009.
European Patent Office, International Searching Authority, "International Search Report," for International Application No. PCT/US2009/049006, mailed Sep. 11, 2009.
Thiyagarajan, Venkatesan et al. "Always-On-Top Media Player Launched From a Web Browser," U.S. Appl. No. 12/617,271, filed Nov. 12, 2009.
Australian Government "Office Action," Australian Patent Application No. 2006240518, mailed Nov. 12, 2009.
USPTO, Final Office Action, mailed Nov. 6, 2009; U.S. Appl. No. 09/809,868, filed Mar. 15, 2001.
USPTO, Final Office Action mailed Nov. 12, 2009; U.S. Appl. No. 11/620,707, filed Jan. 7, 2007.
Newton's Telecom Dictionary, 21st ed., Mar. 2005.
European Patent Office, European Search Report, mailed Sep. 28, 2009 for European Application No. EP 06 78 6175.
Paul, John Michael et al. "Systems and Methods for Delivering Messages Over a Network," U.S. Appl. No. 12/619,192, filed Nov. 16, 2009.
USPTO Final Office Action mailed Jan. 25, 2010; U.S. Appl. No. 11/734,277, filed Apr. 12, 2007.
USPTO, Non-Final Office Action mailed Nov. 23, 2009; U.S. Appl. No. 11/683,862, filed Mar. 8, 2007.
International Search Report for PCT/US2008/069914 mailed Dec. 19, 2008.
Ditze M. et all "Resource Adaptation for Audio-Visual Devices in the UPnP QoS Architecture," Advanced Networking and Applications, 2006; AINA, 2006; 20% H International conference on Vienna, Austria Apr. 18-20, 2006.
Joonbok, Lee et al. "Compressed High Definition Television (HDTV) Over IPv6," Applications and the Internet Workshops, 2006; Saint Workshops, 2006; International Symposium, Phoenix, AZ, USA, Jan. 23-27, 2006.
Lowekamp, B. et al. "A Hierarchy of Network Performance Characteristics for Grid Applications and Services," GGF Network Measurements Working Group, pp. 1-29, May 24, 2004.
USPTO, Non-Final Office Action mailed Oct. 1, 2009; U.S. Appl. No. 11/778,287, filed Jul. 16, 2007.
Rao, Padmanabha R. et al. "Methods and Apparatus for Establishing Network Connections Using an Inter-Mediating Device," U.S. Appl. No. 12/642,368, filed Dec. 18, 2009.
Dham, Vikram et al. "Systems and Methods for Establishing Network Connections Using Local Mediation Services," U.S. Appl. No. 12/644,918, filed Dec. 22, 2009.
Paul, John et al. "Systems and Methods for Remotely Controlling Media Server Via a Network," U.S. Appl. No. 12/645,870, filed Dec. 23, 2009.
USPTO Final Office Action mailed Dec. 30, 2009; U.S. Appl. No. 11/147,664, filed Jun. 7, 2005.
Meyer, Derrick "MyReplayTV™ Creates First-Ever Online Portal to Personal TI! Service; Gives Viewers Whole New Way to Interact With Programming," http://web.archive.org/web/20000815052751/http://www.myreplaytv.com/, Aug. 15, 2000.
Sling Media "Sling Media Unveils Top-of-Line Slingbox PRO-HD" [online], Jan. 4, 2008, XP002560049; retrieved from the Internet: URL:www.slingmedia.com/get/pr-slingbox-pro-hd.html; retrieved on Oct. 12, 2009.
PCT Partial International Search, PCT/US2009/054893, mailed Dec. 23, 2009.
Bajpal, Parimal et al. "Method and Node for Transmitting Data Over a Communication Network using Negative Ackhowledgement," U.S. Appl. No. 12/404,920, filed Mar. 16, 2009.
Bajpal, Parimal et al. "Method and Note for Employing Network connections Over a Connectinoless Transport Layer Protocol," U.S. Appl. No. 12/405,062, filed Mar. 16, 2009.
Asnis, Ilya et al. "Mediated Network address Translation Traversal" U.S. Appl. No. 12/405,039, filed Mar. 16, 2009.
Srisuresh, P. et al. "Traditional IP Network Address Translator (Traditional NAT)," Network Working Group, The Internet Society, Jan. 2001.
Paul, John et al. "Systems and Methods for Searching Media Content," U.S. Appl. No. 12/648,024, filed Dec. 28, 2009.

(56) References Cited

OTHER PUBLICATIONS

China State Intellectual Property Office "First Office Action," Jan. 8, 2010; Application No. 200810126554.0.
"The Authoritative Dictionary of IEEE Standard Terms," 7th ed. 2000.
Newton's Telcom Dictionary, 20th ed., Mar. 2004.
Jain, Vikal Kumar "Systems and Methods for Coordinating Data Communication Between Two Device," U.S. Appl. No. 12/699,280, filed Feb. 3, 2010.
European Patent Office, International Searching Authority, "International Search Report," mailed Mar. 30, 2010; International Application PCT/US2009/068468, filed Dec. 27, 2009.
European Patent Office, European Search Report for European Application No. EP 08 16 7880, mailed Mar. 4, 2009.
Mythtv Wiki, "MythTV User Manual" [Online], Aug. 27, 2007, XP002515046; retrieved from the Internet: <URL:http://www.mythtv.org/wiki?title=User_Manual:Introduction&oldid=25549>.
International Searching Authority, Written Opinion and International Search Report for International Application No. PCT/US2008/077733, mailed Mar. 18, 2009.
International Searching Authority, Written Opinion and International Search Report for International Application No. PCT/US2008/087005, mailed Mar. 20, 2009.
Watanabe Y. et al., "Multimedia Database System for TV Newscasts and Newspapers"; Lecture Notes in Computer Science, Springer Verlag, Berlin, Germany; vol. 1554, Nov. 1, 1998, pp. 208-220, XP002402824, ISSN: 0302-9743.
Yasuhiko Watanabe et al., "Aligning Articles in TV Newscasts and Newspapers"; Proceedings of the International Conference on Computationallinguistics, XX, XX, Jan. 1, 1998, pp. 1381-1387, XP002402825.
Sodergard C. et al., "Integrated Multimedia Publishing: Combining TV and Newspaper Content on Personal Channels"; Computer Networks, Elsevier Science Publishers B.V., Amsterdam, Netherlands; vol. 31, No. 11-16, May 17, 1999, pp. 1111-1128, XP004304543, ISSN: 1389-1286.
Ariki Y. et al., "Automatic Classification of TV News Articles Based on Telop Character Recognition"; Multimedia Computing and Systems, 1999; IEEE International Conference on Florence, Italy, Jun. 7-11, 1999, Los Alamitos, California, USA, IEEE Comput. Soc. US; vol. 2, Jun. 7, 1999, pp. 148-152, XP010519373, ISBN: 978-0-7695-0253-3; abstract, paragraph [03.1], paragraph [05.2], figures 1,2.
USPTO, Non-Final Office Action mailed Dec. 17, 2004; U.S. Appl. No. 09/809,868, filed Mar. 15, 2001.
USPTO, Final Office Action mailed Jul. 28, 2005; U.S. Appl. No. 09/809,868, filed Mar. 15, 2001.
USPTO, Non-Final Office Action mailed Jan. 30, 2006; U.S. Appl. No. 09/809,868, filed Mar. 15, 2001.
USPTO, Final Office Action mailed Aug. 10, 2006; U.S. Appl. No. 09/809,868, filed Mar. 15, 2001.
USPTO, Non-Final Office Action mailed Jun. 19, 2007; U.S. Appl. No. 09/809,868, filed Mar. 15, 2001.
USPTO, Non-Final Office Action mailed Apr. 16, 2008; U.S. Appl. No. 09/809,868, filed Mar. 15, 2001.
USPTO, Final Office Action mailed Sep. 18, 2008; U.S. Appl. No. 09/809,868, filed Mar. 15, 2001.
USPTO, Non-Final Office Action mailed Mar. 31, 2009; U.S. Appl. No. 09/809,868, filed Mar. 15, 2001.
USPTO, Non-Final Office Action mailed May 1, 2008; U.S. Appl. No. 11/111,265, filed Apr. 21, 2005.
USPTO, Final Office Action mailed Dec. 29, 2008; U.S. Appl. No. 11/111,265, filed Apr. 21, 2005.
USPTO, Non-Final Office Action mailed Jun. 8, 2009; U.S. Appl. No. 11/111,265, filed Apr. 21, 2005.
USPTO, Non-Final Office Action mailed Jun. 26, 2008; U.S. Appl. No. 11/620,707, filed Jan. 7, 2007.
USPTO, Final Office Action mailed Oct. 21, 2008; U.S. Appl. No. 11/620,707, filed Jan. 7, 2007.
USPTO, Non-Final Office Action mailed Mar. 25, 2009; U.S. Appl. No. 11/620,707, filed Jan. 7, 2007.
USPTO, Non-Final Office Action mailed Aug. 7, 2008; U.S. Appl. No. 11/620,711, filed Jan. 7, 2007.
USPTO, Final Office Action mailed Feb. 9, 2009; U.S. Appl. No. 11/620,711, filed Jan. 7, 2007.
USPTO, Non-Final Office Action mailed Feb. 25, 2009; U.S. Appl. No. 11/683,862, filed Mar. 8, 2007.
USPTO, Non-Final Office Action mailed Dec. 24, 2008; U.S. Appl. No. 11/147,985, filed Jun. 7, 2005.
USPTO, Non-Final Office Action mailed Jun. 25, 2008; U.S. Appl. No. 11/428,254, filed Jun. 30, 2006.
USPTO, Final Office Action mailed Feb. 6, 2009; U.S. Appl. No. 11/428,254, filed Jun. 30, 2006.
USPTO, Non-Final Office Action mailed May 15, 2009; U.S. Appl. No. 11/147,664, filed Jun. 7, 2005.
Sonic Blue "ReplayTV 5000 User's Guide," 2002, entire document.
Bluetooth-News; Main Future User Models Document Verification & Qualification: Bluetooth Technical Background, Apr. 21, 1999; pp. 1 of 7 and 2 of 7; http://www.bluetooth.com/v2/news/show.asp 1-2.
Microsoft Corporation; Harman/Kardon "Master Your Universe" 1999.
Matsushita Electric Corporation of America MicroCast: Wireless PC Multimedia Transceiver System, Nov. 1998.
"Wireless Local Area Networks: Issues in Technology and Standards" Jan. 6, 1999.
USPTO, Final Office Action mailed Jun. 25, 2009; U.S. Appl. No. 11/147,985, filed Jun. 7, 2005.
International Search Report and Written Opinion for International Application No. PCT/US2006/025912, mailed Jul. 17, 2008.
International Search Report for International Application No. PCT/US2008/059613, mailed Jul. 21, 2008.
International Search Report and Written Opinion for International Application No. PCT/US2008/080910, mailed Feb. 16, 2009.
Wikipedia "Slingbox" [Online], Oct. 21, 2007, XP002512399; retrieved from the Internet: <URL:http://en.wikipedia.org/w/index.php?title=Slingbox&oldid=166080570>; retrieved on Jan. 28, 2009.
Wikipedia "LocationFree Player" [Online], Sep. 22, 2007, XP002512400; retrieved from the Internet: <URL:http://en.wikipedia.org/w/index.php?title=LocationFree_Player&oldid=159683564>; retrieved on Jan. 28, 2009.
Capable Networks LLC "Keyspan Remote Control—Controlling Your Computer With a Remote" [Online], Feb. 21, 2006, XP002512495; retrieved from the Internet: <URL:http://www.slingcommunity.com/article/11791/Keyspan-Remote-Control---Controlling-Your-Computer-With-a-Remote/?highlight=remote+control>; retrieved on Jan. 28, 2009.
Sling Media Inc. "Slingbox User Guide" [Online] 2006, XP002512553; retrieved from the Internet: <URL:http://www.slingmedia.hk/attach/en-US_Slingbox_User_Guide_v1.2.pdf>; retrieved on Jan. 29, 2009.
Sony Corporation "LocationFree TV" [Online], 2004, SP002512410; retrieved from the Internet: <URL:http://www.docs.sony.com/release/LFX1_X5revision.pdf>; retrieved on Jan. 28, 2009 [note—document uploaded in two parts as file exceeds the 25MB size limit].
Sony Corporation "LocationFree Player Pak—LocationFree Base Station—LocationFree Player" [Online] 2005, XP002512401; retrieved from the Internet: <URL:http://www.docs.sony.com/release/LFPK1.pdf>; retrieved on Jan. 28, 2009.
USPTO Final Office Action mailed Mar. 3, 2010; U.S. Appl. No. 11/111,265, filed Apr. 21, 2005.
USPTO Final Office Action mailed Mar. 12, 2010; U.S. Appl. No. 11/620,711, filed Jan. 7, 2007.
USPTO Non-Final Office Action mailed Mar. 19, 2010; U.S. Appl. No. 11/147,664, filed Jun. 7, 2005.
USPTO Non-Final Office Action mailed Mar. 31, 2010; U.S. Appl. No. 11/620,707, filed Jan. 7, 2007.
USPTO Non-Final Office Action mailed Apr. 1, 2010; U.S. Appl. No. 12/237,103, filed Sep. 24, 2008.
Gurzhi, Alexander et al. "Systems and Methods for Emulation Network-Enabled Media Components," U.S. Appl. No. 12/711,830, filed Feb. 24, 2010.

(56) References Cited

OTHER PUBLICATIONS

European Patent Office, International Searching Authority, "International Search Report" mailed Apr. 18, 2011; International Appln. No. PCT/US2011/023135, filed Jan. 31, 2011.
European Patent Office, International Searching Authority, "International Search Report" mailed Apr. 28, 2011; International Appln. No. PCT/IN2011/000080, filed Feb. 3, 2011.
European Patent Office, International Searching Authority, "International Search Report" mailed May 3, 2011; International Appln. No. PCT/US2011/023134, filed Jan. 31, 2011.
International Search Report and Written Opinion, PCT/US2005/020105, Feb. 15, 2007, 6 pages.
International Search Report and Written Opinion for PCT/US2006/04382, mailed Apr. 27, 2007.
Archive of "TV Brick Home Server," www.tvbrick.com, [online] [Archived by http://archive.org on Jun. 3, 2004; Retrieved on Apr. 12, 2006] retrieved from the Internet <URL:http://web.archive.org/web/20041107111024/www.tvbrick.com/en/affiliate/tvbs/tvbrick/document18/print>.
Faucon, B. "TV 'Brick' Opens up Copyright Can of Worms, "Financial Review, Jul. 1, 2003, [online [Retrieved on Apr. 12, 2006] Retrieved from the Internet, URL:http://afr.com/cgi-bin/newtextversions.pl?storyid+1056825330084&3ate+2003/07/01&pagetype+printer§ion+1053801318705&path +articles/2003/06/30/0156825330084.html].
Balster, Eric J., "Video Compression and Rate Control Methods Based on the Wavelet Transform," The Ohio State University 2004, pp. 1-24.
Kulapala et al., "Comparison of Traffic and Quality Characteristics of Rate-Controlled Wavelet and DCT Video," Arizona State University, Oct. 11, 2004.
Skodras et al., "JPEG2000: The Upcoming Still Image Compression Standard," May 11, 2000, 14 pages.
Taubman et al., "Embedded Block Coding in JPEG2000," Feb. 23, 2001, pp. 1-8 of 36.
Kessler, Gary C., An Overview of TCP/IP Protocols and the Internet; Jan. 16, 2007, retrieved from the Internet on Jun. 12, 2008 at http://www.garykessler.net/library/tcpip.html; originally submitted to the InterNIC and posted on their Gopher site on Aug. 5, 1994.
Roe, Kevin, "Third-Party Observation Under EPC Article 115 on the Patentability of an Invention," Dec. 21, 2007.
Roe, Kevin, Third-Party Submission for Published Application Under CFR §1.99, Mar. 26, 2008.
Kulkarni, Anant Madhava "Systems and Methods for Creating Logical Media Streams for Media Storage and Playback," U.S. Appl. No. 12/323,907, filed Nov. 26, 2008.
Rao, Padmanabha R. "Systems and Methods for Linking Media Content," U.S. Appl. No. 12/359,784, filed Jan. 26, 2009.
International Search Report for International Application No. PCT/US2007/063599, mailed Dec. 12, 2007.
International Search Report for International Application No. PCT/US2007/076337, mailed Oct. 20, 2008.
International Search Report and Written Opinion for International Application No. PCT/US2006/025911, mailed Jan. 3, 2007.
Qiong, Liu et al. "Digital Rights Management for Content Distribution," Proceedings of the Australasian Information Security Workshop Conference on ACSW Frontiers 2003, vol. 21, 2003, XP002571073, Adelaide, Australia, ISSN: 1445-1336, ISBN: 1-920682-00-7, sections 2 and 2.1.1.
USPTO "Final Office Action" mailed Jan. 7, 2013 for U.S. Appl. No. 12/699,280, filed Feb. 3, 2010.
USPTO, Office Action for U.S. Appl. No. 12/699,280, mailed Oct. 4, 2013.
China State Intellectual Property Office "Office Action" issued Mar. 18, 2010 for Application No. 200680022520.6.
China State Intellectual Property Office "Office Action" issued Apr. 13, 2010 for Application No. 200580026825.X.
Canadian Intellectual Property Office "Office Action" mailed Feb. 18, 2010 for Application No. 2569610.
European Patent Office "European Search Report," mailed May 7, 2010 for Application No. 06786174.0.
Margulis, Neal "Apparatus and Method for Effectively Implementing a Wireless Television System," U.S. Appl. No. 12/758,193, filed Apr. 12, 2010.
Margulis, Neal "Apparatus and Method for Effectively Implementing a Wireless Television System," U.S. Appl. No. 12/758,194, filed Apr. 12, 2010.
Margulis, Neal "Apparatus and Method for Effectively Implementing a Wireless Television System," U.S. Appl. No. 12/758,196, filed Apr. 12, 2010.
Kirkorian, Jason Gary et al. "Personal Media Broadcasting System with Output Buffer," U.S. Appl. No. 12/757,697, filed Apr. 9, 2010.
Tarra, Raghuveer et al. "Firmware Update for Consumer Electronic Device," U.S. Appl. No. 12/757,714, filed Apr. 9, 2010.
USPTO "Non-Final Office Action" mailed Jul. 30, 2012 for U.S. Appl. No. 12/699,280, filed Feb. 3, 2010.
European Patent Office, Examination Report, dated Mar. 12, 2014 for European Patent Application No. 11711690.5.

* cited by examiner

CONNECTION PRIORITY SERVICES FOR DATA COMMUNICATION BETWEEN TWO DEVICES

TECHNICAL FIELD

Embodiments of the subject matter described herein relate generally to data communication systems and techniques. More particularly, embodiments of the subject matter relate to the coordination of data communication between two devices that are capable of supporting different connection modes and/or connection protocols.

BACKGROUND

A vast number of systems, computer devices, consumer products, electronic devices, and other components rely upon data communication for day-to-day operation. For example, data is often shared among computers in many various forms. One popular form that facilitates information sharing is known as the client-server model, which is commonly realized as a client-server paradigm. In a client-server network, a server application or device fulfills requests from any number of client applications or devices. Servers often manage the storage of vast amounts of data, to which one or many client applications have access. As another example, modern wireless devices (e.g., a laptop computer, a cellular telephone, a handheld video game device, or a digital media player) support wireless data communication with other wireless devices, desktop computers, wireless local area network (WLAN) infrastructure components, and the like. Fundamentally, any form of data communication between two devices can only take place if the two devices are compatible with each other. In other words, both devices must support a common data communication scheme to successfully carry out data communication.

It may be possible for two devices to support multiple data connection modes, protocols, or techniques that are used to establish a data communication session between the two devices. The use of alternative connection modes, protocols, and/or techniques may be desirable to increase the likelihood of successful data communication sessions, to provide different levels of service to users, to provide redundancy or backup communication channels, or the like. In a system that supports multiple data connection modes, it may be necessary for one or both devices to attempt to initiate data communication sessions using a plurality of different protocols or techniques before data communication can be performed between the two devices.

BRIEF SUMMARY

An exemplary embodiment of a method for coordinating data communication between a first device and a second device is provided. In accordance with this method, the first device determines a connection mode sequence for a plurality of different data communication modes supported by the first device. The method continues by attempting, in accordance with the connection mode sequence, to establish a data communication session between the first device and the second device until a successful data communication mode is identified. Thereafter, data communication is performed between the first device and the second device, using the successful data communication mode.

An exemplary embodiment of a digital media player device is also provided. The digital media player device includes a processor and a communication module coupled to the processor. The communication module is configured to support data communication with a digital media place-shifting device. The processor and the communication module cooperate to attempt to establish data communication with the digital media place-shifting device in accordance with a connection mode sequence that identifies a plurality of different data communication modes supported by the digital media player device, until one of the plurality of different data communication modes can be used to initiate a data communication session between the digital media player device and the digital media place-shifting device. The processor and the communication module also cooperate to perform data communication with the digital media place-shifting device, using the one of the plurality of different data communication modes.

Also provided is an exemplary embodiment of a method for coordinating data communication between a digital media player device and a digital media place-shifting device. This method involves receiving, at a server device, connection mode capabilities data for a plurality of different data communication modes, the connection mode capabilities data being related to data communication capabilities of the digital media place-shifting device. The method continues by sending, from the server device to the digital media place-shifting device, connection mode priority data for the plurality of different data communication modes, the connection mode priority data indicating a ranking of the plurality of different data communication modes. The connection mode capabilities data and the connection mode priority data influence the manner in which the digital media player device and the digital media place-shifting device attempt to establish a data communication session using the plurality of different data communication modes.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
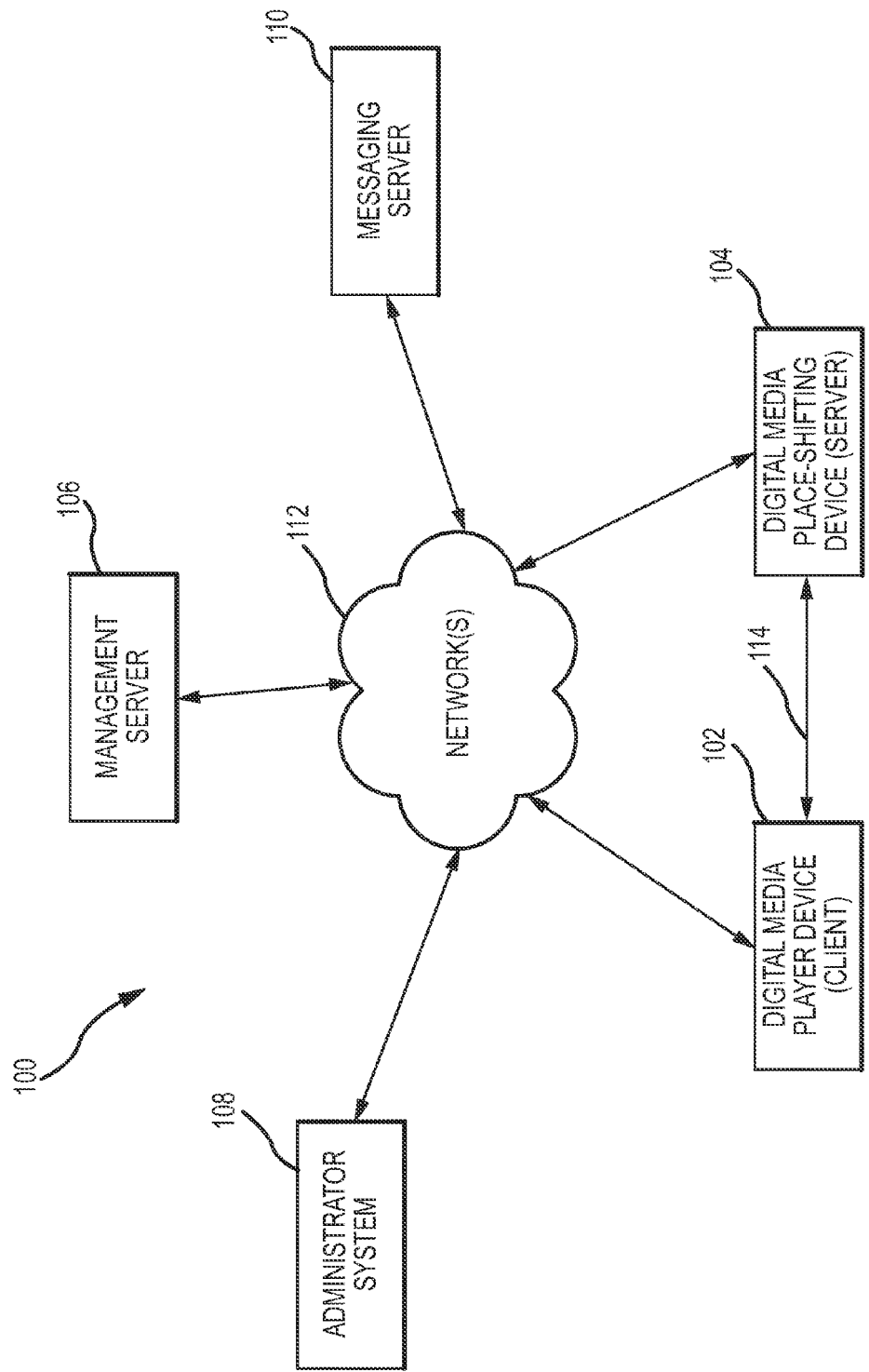
FIG. 1 is a schematic representation of an exemplary embodiment of a data communication system that supports different data communication connection modes between two devices.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Referring now to the drawings, FIG. 1 is a schematic representation of an exemplary embodiment of a data communication system 100 that supports different data communication connection modes between two devices. For this particular example, the two devices are configured as a digital media player device 102 and a digital media place-shifting device 104 (although other device types, platforms, and/or configurations could be employed). For purposes of this example, the digital media player device 102 may be considered to be a client device, and the digital media place-shifting device 104 may be considered to be a server device, where the two devices cooperate in a client-server arrangement. This embodiment of the system 100 utilizes a central server device, system, application, or processing logic that coordinates and manages data communication between the digital media player device 102 and the digital media place-shifting device 104. For the embodiment depicted in FIG. 1, this management/coordination role is performed by a management server 106. The system 100 may also include or cooperate with an administrator system 108 and a messaging server 110. The operating components, elements, and devices of the data communication system 100 can communicate with one another as needed using a suitably configured network architecture 112.

The digital media player device 102 can be communicatively and/or physically coupled to the digital media place-shifting device 104 using at least one data communication link 114 that facilitates data communication between the digital media player device 102 and the digital media place-shifting device 104 (from the digital media player device 102 to the digital media place-shifting device 104 only, from the digital media place-shifting device 104 to the digital media player device 102 only, or bi-directionally). Alternatively or additionally, the digital media player device 102 could communicate with the digital media place-shifting device 104 though the network architecture 112. Similarly, the management server 106, the administrator system 108, and the messaging server 110 can be communicatively and/or physically coupled to the digital media player device 102 and to the digital media place-shifting device 104, via the network architecture 112. Thus, the five items depicted in FIG. 1 may support data communication with and between each other as needed for the operation and functionality of the system 100 described herein.

A data communication link depicted in FIG. 1 may represent a single direct link between two devices or a plurality of links that cooperate with one another to establish the desired path between two devices. A data communication link depicted in FIG. 1 could employ wireless data communication techniques and technologies, tangible (wired, cabled, optical, etc.) data communication techniques and technologies, or a combination of both. Moreover, a data communication link depicted in FIG. 1 may be established using one or more data communication networks, as is well understood. In this regard, the network architecture 112 may include one or more data communication networks that accommodate the transmission of data using wireless and/or wired data communication techniques, technologies, and protocols. For example, the network architecture 112 may include, without limitation: a local area network (LAN); a wireless local area network (WLAN); a wide area network (WAN) such as the Internet; a telecommunication services network (wireless or traditional); a personal area network (PAN); a cable or satellite television services network; or the like.

The administrator system 108 may be realized using one or more pieces of hardware, which can be suitably configured to execute a number of software applications and/or routines associated with administrative, backend, or other control functions of the system 100. For example, the administrator system 108 could be implemented as a computer system with a user interface that enables a user of the administrator system 108 to make business-related changes or modifications to the system 100 as needed. As described in more detail below, the administrator system 108 can be used to execute business decisions, configure and implement end user options or preferences, maintain and modify connection mode priority data for devices within the system 100, or the like. Depending upon the particular embodiment, the management server 106, certain features or functions of the management server 106, the messaging server 110, and/or certain features or functions of the messaging server 110 may be implemented with or otherwise incorporated into the administrator system 108.

The management server 106 may be realized using one or more pieces of hardware, which can be suitably configured to execute a number of software applications and/or routines associated with the various data communication coordination techniques, methodologies, and processes described here. For example, the management server 106 may be suitably configured to track the public network addresses (e.g., IP addresses) of digital media place-shifting devices in the system 100, which may be dynamic in nature, and map static "finder identifiers" or other unique locators to the respective public network addresses. The management server 106 may also be used to regulate certain core features and functions of digital media player devices in the system 100. In certain embodiments, the management server 106 is realized as a piece of equipment that is remotely located relative to the digital media player device 102 and relative to the digital media place-shifting device 104. Depending upon the particular embodiment, the administrator system 108, certain features or functions of the administrator system 108, the messaging server 110, and/or certain features or functions of the messaging server 110 may be implemented with or otherwise incorporated into the management server 106.

The messaging server 110 may be realized using one or more pieces of hardware, which can be suitably configured to execute a number of software applications and/or routines associated with the provision of certain types of connection modes associated with data communication between the digital media player device 102 and the digital media place-shifting device 104. The operation and functionality of the messaging server 110 are described in more detail below. In certain embodiments, the messaging server 110 is realized as a piece of equipment that is remotely located relative to the digital media player device 102 and relative to the digital media place-shifting device 104. Depending upon the particular embodiment, the administrator system 108, certain features or functions of the administrator system 108, the management server 106, and/or certain features or functions of the management server 106 may be implemented with or otherwise incorporated into the messaging server 110.

Figure 2:
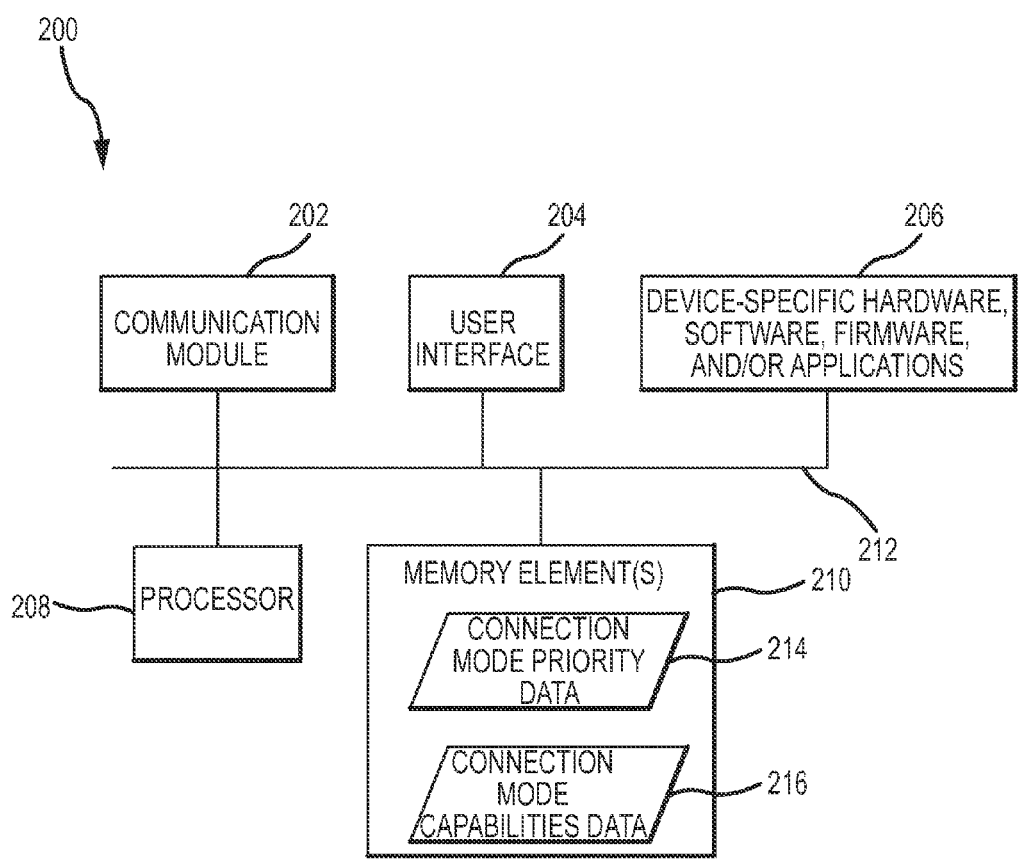
FIG. 2 is a schematic representation of an exemplary embodiment of a device that is suitable for use in the data communication system depicted in FIG. 1.

FIG. 2 is a schematic representation of an exemplary embodiment of a device 200 that is suitable for use in the data communication system 100. In the context of the system 100, the device 200 could represent the management server 106, the digital media player device 102, or the digital media place-shifting device 104. Of course, the device 200 will include additional features, elements, and processing logic as needed to support the desired functionality.

In practice, the device 200 will be suitably configured to support the particular application and system architecture. For example, the device 200 could be realized using any conventional computer platform with the appropriate hardware, software, firmware, etc. For the illustrated embodiment, the device 200 includes, without limitation: a communication module 202; a user interface 204; device-specific hardware, software, firmware, and/or applications 206; at least one processor 208; and at least one memory element 210 having a suitable amount of storage capacity. An implementation of the device 200 may include additional functional elements and components that are suitably configured to support traditional or well known features, which will not be described in detail here. The elements of the device 200 may be coupled together via a bus 212 or any suitable interconnection architecture.

The device 200 employs at least one communication module 202, which may be suitably configured to support wireless data communication and/or non-wireless (wired or cabled) data communication with other devices. Thus, the communication module 202 may be suitably configured to support wireless/wired data communication (unidirectional or bidirectional, depending upon the particular implementation) between the device 200 and other devices in the system.

In certain embodiments, the communication module 202 is configured to support one or more wireless data communication protocols. Any number of suitable wireless data communication protocols, techniques, or methodologies may be supported by the device 200, including, without limitation: RF; IrDA (infrared); BLUETOOTH®; ZigBee (and other variants of the IEEE 802.15.4 protocol); IEEE 802.11 (any variation); IEEE 802.16 (WiMAX or any other variation); Direct Sequence Spread Spectrum; Frequency Hopping Spread Spectrum; wireless telecommunication protocols; wireless home network communication protocols; paging network protocols; magnetic induction; satellite data communication protocols; wireless hospital or health care facility network protocols such as those operating in the WMTS bands; GPRS; and proprietary wireless data communication protocols such as variants of Wireless USB. In an embodiment of the device 200, a wireless data communication module may include or be realized as hardware, software, and/or firmware, such as an RF front end, a suitably configured radio module (which may be a stand alone module or integrated with other or all functions of the device), a wireless transmitter, a wireless receiver, a wireless transceiver, an infrared sensor, an infrared diode and sensor, an electromagnetic transducer, or the like. Moreover, the device 200 may include one or more antenna arrangements that cooperate with the communication module 202.

In some embodiments, the communication module 202 supports data transfer over a cable, a wired connection, or other physical link. In this regard, the communication module 202 could be adapted to support one or more wired/cabled data communication protocols. Any number of suitable data communication protocols, techniques, or methodologies may be supported by the device 200, including, without limitation: Ethernet; home network communication protocols; USB; IEEE 1394 (Firewire); hospital network communication protocols; and proprietary data communication protocols. In an embodiment of the device 200, a wired data communication module may include or be realized as hardware, software, and/or firmware, such as a suitably configured and formatted port, connector, jack, plug, receptacle, socket, adaptor, or the like.

The user interface 204 may include any number of user interface features that allow a user to control the operation of the device 200 and/or other devices within the system. In this regard, the user interface 204 may include a keypad, keys, buttons, switches, knobs, a touchpad, a joystick, a pointing device, a virtual writing tablet, a display element, a speaker or other audio transducer, indicator lights, or any device, component, or function that enables the user to select options, input information, obtain audio information, obtain visual information, or otherwise interact with the device 200 and/or other devices within the system.

The device-specific hardware, software, firmware, and/or applications 206 may vary from one embodiment of the device 200 to another. Accordingly, if the device 200 is embodied as the management server 106, then the device-specific hardware, software, firmware, and/or applications 206 will support the data communication management and coordination functions described herein. On the other hand, if the device 200 is embodied as the digital media player device 102, then the device-specific hardware, software, firmware, and/or applications 206 will support various operations and functions related to the playback and presentation of digital media content. If, however, the device 200 is embodied as the digital media place-shifting device 104, then the device-specific hardware, software, firmware, and/or applications 206 will support techniques, technologies, and processes related to the place-shifting, encoding, and delivery of digital media content. Accordingly, the device-specific hardware, software, firmware, and/or applications 206 will support the desired functions, operations, and processing requirements of the particular implementation of the device 200. In practice, certain portions or aspects of the device-specific hardware, software, firmware, and/or applications 206 may be implemented in one or more of the other blocks depicted in FIG. 2.

The processor 208 may be implemented or performed with a general purpose processor, a content addressable memory, a digital signal processor, an application specific integrated circuit, a field programmable gate array, any suitable programmable logic device, discrete gate or transistor logic, discrete hardware components, or any combination designed to perform the functions described here. The processor 208 may be realized as a microprocessor, a controller, a microcontroller, or a state machine. Moreover, the processor 208 may be implemented as a combination of computing devices, e.g., a combination of a digital signal processor and a microprocessor, a plurality of microprocessors, one or more microprocessors in conjunction with a digital signal processor core, or any other such configuration. The processor 208 cooperates with other elements of the device 200 to perform, execute, and manage the various functions, operations, processes, and techniques described herein (which may relate to the management server 106, the digital media player device 102, or the digital media place-shifting device 104, depending upon the manner in which the device 200 is actually deployed).

The memory element 210 may be realized as RAM memory, flash memory, EPROM memory, EEPROM memory, registers, a hard disk, a removable disk, a CD-ROM, or any other form of storage medium known in the art. In this regard, the memory element 210 can be coupled to the processor 208 to enable the processor 208 to read information from, and write information to, the memory element 210. In the alternative, the memory element 210 may be integral to the processor 208. As an example, the processor 208 and the memory element 210 may reside in an ASIC. In certain embodiments, the memory element 210 is utilized to store and maintain connection mode priority data 214 and/or connection mode capabilities data 216 that is related to certain data communication capabilities, characteristics, parameters, and other factors associated with data communication between the digital media player device 102 and the digital media place-shifting device 104. In this regard, the management server 106 is able to store connection mode priority data 214 and/or connection mode capabilities data 216 corresponding to a plurality of different digital media place-shifting devices, and, therefore, the device 200 might store and maintain a list or a table of information having entries for each of the different digital media place-shifting devices. The digital media player device 102 may also need to store connection mode priority data 214 and/or connection mode capabilities data 216 corresponding to the digital media place-shifting device 104. Moreover, the digital media place-shifting device 104 may also store connection mode priority data 214 (which may be provided by the management server 106) and/or its own connection mode capabilities data 216 (which can be sent from the digital media place-shifting device 104 to the management server 106 as needed).

In accordance with certain embodiments, two devices (such as a client device and a server device) support a plurality of different data communication modes, each of which can be used to establish a data communication session between those two devices. The two devices attempt to establish a data communication session in accordance with a particular connection mode sequence, until a successful data communication mode is identified or until the routine times out. In this regard, a first data communication mode is initially used in an attempt to establish a data communication session. If that first data communication mode is unsuccessful, a different data communication mode can be used in an attempt to establish a data communication session, and so on.

A "data communication mode" refers to a specific process, routine, protocol, scheme, technique, and/or technology that is used to facilitate data communication between two devices. It should be appreciated that two different data communication modes may be incompatible, fully compatible, or partially compatible with each other. Moreover, a data communication mode used by the system 100 may be compatible with one or more well-known standards or technical specifications, it may be non-standardized, or it may be proprietary. For example, and without limitation, the system 100 could utilize one or more of the following data communication modes: Transmission Control Protocol (TCP); User Datagram Protocol (UDP); a mode that employs any of the data communication techniques mentioned above with reference to the communication module 202; and variants thereof.

The connection mode priority data 214 indicates an order of preference for the plurality of different data communication modes, where the order of preference can be utilized to determine or otherwise influence the connection mode sequence. In practice, the connection mode priority data 214 for a given device (e.g., a digital media place-shifting device, a server device, etc.) can be used to determine the manner(s) in which that given device can carry out data communication with another device. In this regard, the connection mode priority data 214 might be dependent upon or influenced by information such as, and without limitation: the hardware version of the device; the software version of the device; the firmware version of the device; wireless data communication channels supported by the device; wireless data communication frequencies supported by the device; authentication techniques mandated by the device; security or encryption techniques supported by the device; business decisions that impact subscribers or users of the system; statistical data related to connection mode success rates; statistical data related to connection mode performance; statistical data related to connection mode performance with respect to the time of day; statistical data related to connection mode performance with respect to the load on the management server 106, the administrator system 108, and/or the messaging server 110; the network address (e.g., the IP address) of the device 200; a status, classification, or category of user/subscriber (e.g., a basic user, a premier subscriber, or a preferred customer); or the like. In some embodiments, the connection mode priority data 214 of a given device identifies a plurality of different data communication protocols or modes that are supported by that device, and the connection mode priority data 214 represents a chosen prioritization scheme for the system. For example, the connection mode priority data 214 could include a ranking or ordered listing of the different supported data communication protocols or data communication modes. Notably, the connection mode priority data 214 could be static, fixed, or hard-coded, or it may be dynamic or adaptive in nature (as described in more detail below).

As an example, assume that the system 100 supports four different connection modes: Mode A, Mode B, Mode C, and Mode D. The connection mode priority data 214 may assign a respective priority value, rank, or number to each of the four connection modes. Thus, if Mode B has the highest priority, Mode A has the next highest priority, Mode C has the lowest priority, and Mode D has the second lowest priority, the connection mode priority data 214 may indicate the following relationships: Mode A=2; Mode B=1; Mode C=4; Mode D=3.

The connection mode priority data 214 may be generated, maintained, sent, or received by the device 200 as needed. Referring again to FIG. 1, the connection mode priority data 214 may be generated by the administrator system 108 and sent from the administrator system 108 to the management server 106 as needed. In addition, the management server 106 may send the connection mode priority data 214 to the digital media player device 102 and/or to the digital media place-shifting device 104 as needed. In certain situations, the digital media place-shifting device 104 may send the connection mode priority data 214 directly to the digital media player device 102. Thus, during operation of the system 100 the connection mode priority data 214 could be maintained or saved at one or more of the components of the system 100.

For the exemplary embodiment described here, the connection mode capabilities data 216 indicates certain data communication capabilities of one or more devices in the system. In practice, the connection mode capabilities data 216 for a given device (e.g., a digital media place-shifting device, a server device, etc.) can be used to determine the manner(s) in which that given device can carry out data communication with another device. In this regard, the connection mode capabilities data 216 might be dependent upon or influenced by information such as, and without limitation: the hardware version of the device; the software version of the device; the firmware version of the device; wireless data communication channels supported by the device; wireless data communication frequencies supported by the device; authentication techniques mandated by the device; security or encryption techniques supported by the device; data connectivity between the device 200 and one or more other components, elements, devices, or servers (such as the messaging server 110); or the like. In some embodiments, the connection mode capabilities data 216 of a given device identifies a plurality of different data communication protocols or modes that are potentially supported by that device, and capabilities information for each of those data communication protocols or modes. For example, the connection mode capabilities data 216 could include an entry for each of the different data communication protocols or modes, where each entry includes a value, a code, or a description that is somehow related to data communication capabilities of the respective data communication protocol or mode.

The exemplary embodiment described here utilizes four-bit values for the connection mode capabilities data 216. Although four bits results in sixteen different options, an embodiment need not use all sixteen possible options. Indeed, this example assumes that all but four of the possible options are unused (these unused options could be reserved for future implementations). This particular embodiment has the following capabilities options, which can be applied to each of the different data communication modes: (1) not supported; (2) supported but failed at setup; (3) not tested; and (4) tested and passed. Accordingly, if the device 200 does not support one of the different data communication modes, then the value of the connection mode capabilities data 216 for that unsupported mode will correspond to the "not supported" status. In practice, there may be one or more data communication modes that must be configured, initialized, or otherwise activated during a setup routine for the device 200. In such a scenario, those data communication modes are considered to be "supported" even though they need not always be available. In other words, a supported data communication mode would not be available to establish a data communication session if that mode failed during setup or if that mode was not properly configured or initialized at the device 200. Under these circumstances, the value of the connection mode capabilities data 216 will correspond to the "supported but failed at setup" status. Therefore, if the connection mode capabilities data for a data communication mode is "unsupported" or "supported but failed at setup," the two devices will not use that particular mode while attempting to establish a data communication session.

As one example, out-of-home connections using a TCP data communication mode might require port forwarding to be enabled in a router to which the digital media place-shifting device 104 is connected. Thus, when the digital media place-shifting device 104 is initially configured and set up, port forwarding must be enabled or selected if out-of-home connections are desired. If the user does not enable port forwarding, then this form of TCP data communication will not be usable even though it is technically supported by the digital media place-shifting device 104.

The connection mode capabilities data 216 may be generated, maintained, sent, or received by the device 200 as needed. Referring again to FIG. 1, the connection mode capabilities data 216 may be generated by the digital media place-shifting device 104 and sent from the digital media place-shifting device 104 to the management server 106 as needed. In addition, the management server 106 may send the connection mode capabilities data 216 to the digital media player device 102 as needed. In certain situations, the digital media place-shifting device 104 may send the connection mode capabilities data 216 directly to the digital media player device 102. Thus, during operation of the system 100 the connection mode capabilities data 216 could be maintained or saved at one or more of the components of the system 100.

Figure 3:
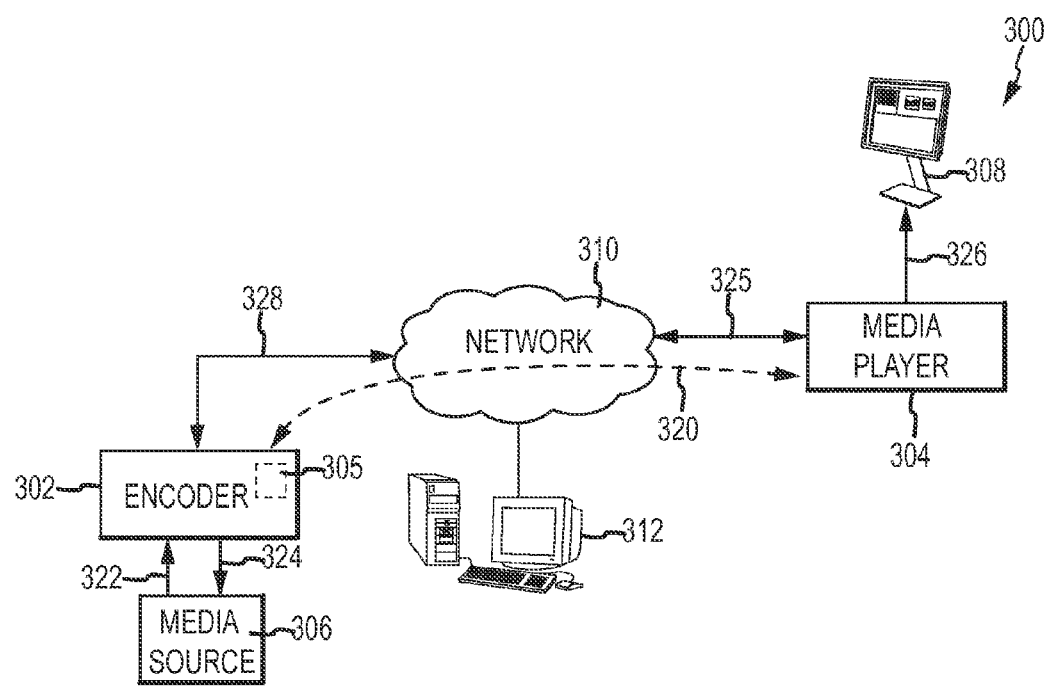
FIG. 3 is a schematic representation of an exemplary embodiment of a media presentation system.

FIG. 3 is a schematic representation of an exemplary embodiment of a media presentation system 300, which is generally arranged in accordance with the system 100 depicted in FIG. 1. The media presentation system 300 can be utilized to carry out place-shifting of digital media content. This particular embodiment of the system 300 includes a digital media processing device (e.g., a digital media place-shifting device 302) that receives media content 322 from a media source 306, encodes the received content into a streaming format, and then transmits the encoded media stream 320 to a remotely-located digital media player (or other presentation device) 304 over a network 310. The digital media player device 304 receives the encoded media stream 320, decodes the stream, and presents the decoded content to a viewer on a television or other display 308. Although not depicted in FIG. 3, the digital media player device 304 includes or cooperates with at least one speaker, audio transducer, or other sound-generating element that supports the presentation of the audio portion of media streams. In various embodiments, a centralized management server 312 (configured as described herein) may also be provided to communicate with the place-shifting device 302 and/or the digital media player device 304 via the network 310 to assist these devices in locating each other, maintaining security, providing or receiving content or information, and/or any other features as desired.

The place-shifting device 302 is any component, hardware, software logic and/or the like capable of transmitting a packetized stream of media content over the network 310. In various embodiments, the place-shifting device 302 incorporates suitable encoder and/or transcoder (collectively "encoder") logic to convert audio/video or other media content 322 into a packetized format that can be transmitted over the network 310. The media content 322 may be received in any format, and may be received from any internal or external media source 306 such as any sort of broadcast, cable or satellite television programming source, a "video-on-demand" or similar source, a digital video disk (DVD) or other removable media, a video camera, and/or the like. The place-shifting device 302 encodes the media content 322 to create the encoded media stream 320 in any manner. In various embodiments, the place-shifting device 302 contains a transmit buffer 305 that temporarily stores encoded data prior to transmission on the network 310.

In practice, an embodiment of the place-shifting device 302 may be implemented using any of the various SLING-BOX products available from Sling Media of Foster City, Calif., although other products could be used in other embodiments. Certain embodiments of the place-shifting device 302 are generally capable of receiving the media content 322 from an external media source 306 such as any sort of digital video recorder (DVR), set top box (STB), cable or satellite programming source, DVD player, and/or the like. In such embodiments, the place-shifting device 302 may additionally provide commands 324 to the media source 306 to produce the desired media content 322. Such commands 324 may be provided over any sort of wired or wireless interface, such as an infrared or other wireless transmitter that emulates remote control commands receivable by the media source 306. Other embodiments, however, may modify or omit this feature entirely.

In other embodiments, the place-shifting device 302 may be integrated with any sort of content-receiving or other capabilities typically affiliated with the media source 306. The place-shifting device 302 may be a hybrid STB or other receiver, for example, that also provides transcoding and place-shifting features. Such a device may receive satellite, cable, broadcast and/or other signals that encode television programming or other content received from an antenna, modem, server and/or other source. A receiver of the place-shifting device 302 may further demodulate or otherwise decode the received signals to extract programming that can be locally viewed and/or place-shifted to the remotely-located digital media player device 304 as appropriate. In this regard, the place-shifting device 302 may also include a content database stored on a hard disk drive, memory, or other storage medium to support a personal or digital video recorder (DVR) feature or other content library as appropriate. Hence, in some embodiments, the media source 306 and the place-shifting device 302 may be physically and/or logically contained within a common component, housing or chassis.

In still other embodiments, the place-shifting device 302 includes or is implemented as a software program, applet, or the like executing on a conventional computing system (e.g., a personal computer). In such embodiments, the place-shifting device 302 may encode, for example, some or all of a screen display typically provided to a user of the computing system for place-shifting to a remote location. One device capable of providing such functionality is the SlingProjector product available from Sling Media of Foster City, Calif., which executes on a conventional personal computer, although other products could be used as well.

The digital media player device 304 is any device, component, module, hardware, software and/or the like capable of receiving the encoded media stream 320 from one or more place-shifting devices 302. In various embodiments, the digital media player device 304 is personal computer (e.g., a "laptop" or similarly portable computer, although desktop-type computers could also be used), a mobile phone, a personal digital assistant, a personal media player, or the like. In many embodiments, the digital media player device 304 is a general purpose computing device that includes a media player application in software or firmware that is capable of securely connecting to the place-shifting device 302, and is capable of receiving and presenting media content to the user of the device as appropriate. In other embodiments, however, the digital media player device 304 is a standalone or other separate hardware device capable of receiving the encoded media stream 320 via any portion of the network 310 and decoding the encoded media stream 320 to provide an output signal 326 that is presented on the display 308. One example of a standalone digital media player device 304 is the SLING-CATCHER product available from Sling Media of Foster City, Calif., although other products could be equivalently used.

The network 310 is any digital or other communications network capable of transmitting messages between senders (e.g., the place-shifting device 302) and receivers (e.g., the digital media player device 304). In various embodiments, the network 310 includes any number of public or private data connections, links or networks supporting any number of communications protocols. The network 310 may include the Internet, for example, or any other network based upon TCP/IP or other conventional protocols. In various embodiments, the network 310 also incorporates a wireless and/or wired telephone network, such as a cellular communications network for communicating with mobile phones, personal digital assistants, and/or the like. The network 310 may also incorporate any sort of wireless or wired local area networks, such as one or more IEEE 802.3 and/or IEEE 802.11 networks.

The place-shifting device 302 and/or the digital media player device 304 are therefore able to communicate in any manner with the network 310 (e.g., using any sort of data communication links 328 and/or 325, respectively). Such data communication may take place over a wide area link that includes the Internet and/or a telephone network, for example; in other embodiments, communications between the place-shifting device 302 and the digital media player device 304 may take place over one or more wired or wireless local area links that are conceptually incorporated within the network 310. In various equivalent embodiments, the place-shifting device 302 and the digital media player device 304 may be directly connected via any sort of cable (e.g., an Ethernet cable or the like) with little or no other network functionality provided.

Many different place-shifting scenarios could be formulated based upon available computing and communications resources, consumer demand and/or any other factors. In various embodiments, consumers may wish to place-shift content within a home, office or other structure, such as from the place-shifting device 302 to a desktop or portable computer located in another room. In such embodiments, the content stream will typically be provided over a wired or wireless local area network operating within the structure. In other embodiments, consumers may wish to place-shift content over a broadband or similar network connection from a primary location to a computer or other remote digital media player device 304 located in a second home, office, hotel or other remote location. In still other embodiments, consumers may wish to place-shift content to a mobile phone, personal digital assistant, media player, video game player, automotive or other vehicle media player, and/or other device via a mobile link (e.g., a GSM/EDGE or CDMA/EVDO connection, any sort of 3G or subsequent telephone link, an IEEE 802.11 "Wi-Fi" link, and/or the like). Several examples of place-shifting applications available for various platforms are provided by Sling Media of Foster City, Calif., although the concepts described herein could be used in conjunction with products and services available from any source.

Figure 4:
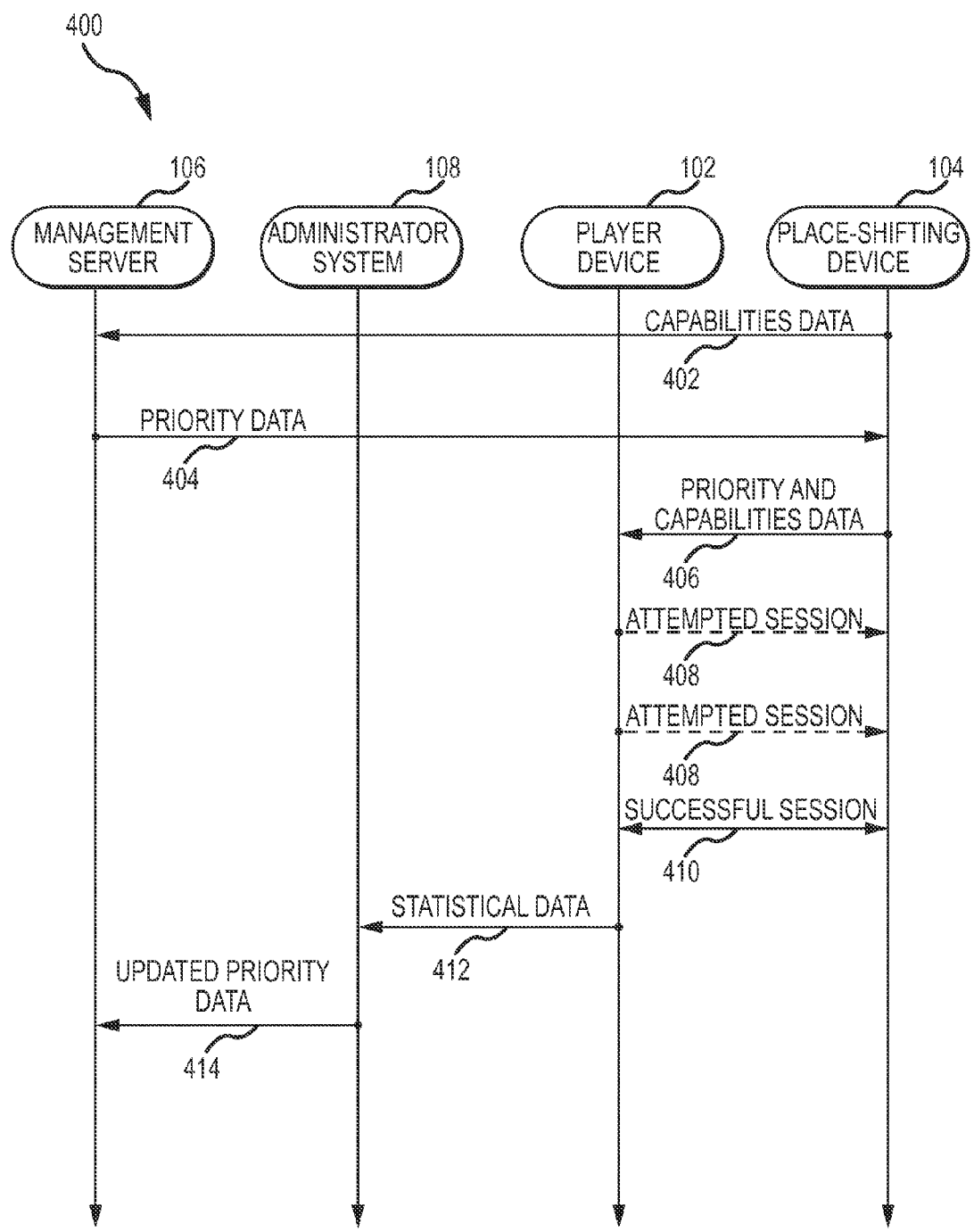
FIG. 4 is a flow diagram that illustrates an exemplary embodiment of a process for coordinating data communication between two devices.

As mentioned previously, the centralized management server 106 can be deployed to facilitate certain connection priority services for data communication between the digital media player device 102 and the digital media place-shifting device 104. In this regard, FIG. 4 is a flow diagram that illustrates an exemplary embodiment of a process 400 for coordinating data communication between two devices. For this flow diagram, the downward direction represents increasing time. The various tasks performed in connection with process 400 may be performed by software, hardware, firmware, or any combination thereof. For illustrative purposes, the following description of process 400 may refer to elements mentioned above in connection with FIGS. 1-3. In practice, portions of process 400 may be performed by different elements of the described system, e.g., the management server 106, the administrator system 108, the digital media player device 102, or the digital media place-shifting device 104. It should be appreciated that process 400 may include any number of additional or alternative tasks, the tasks shown in FIG. 4 need not be performed in the illustrated order, and process 400 may be incorporated into a more comprehensive procedure or process having additional functionality not described in detail herein. Moreover, one or more of the tasks shown in FIG. 4 could be omitted from an embodiment of the process 400 as long as the intended overall functionality remains intact.

The process 400 illustrated in FIG. 4 is performed when the digital media player device 102 is communicatively coupled to the digital media place-shifting device 104 via a LAN architecture. When connected using a LAN architecture, some data communication modes might be preferred over other modes, and/or some data communication modes might be unavailable (although reserved for use with other system or network architectures). This example assumes that the digital media player device 102 has already determined or identified a particular digital media place-shifting device 104 for a data communication session (identification of a particular digital media place-shifting device 104 may be desirable or necessary in an environment having a plurality of available place-shifting devices). The process 400 may begin with one or more preliminary or setup tasks, which could be performed during an initial registration procedure and/or during an update or maintenance procedure. In this regard, the digital media place-shifting device 104 may transmit or send its connection mode capabilities data 402 to the management server 106. For this particular example, the connection mode capabilities data 402 is sent using a persistent data communication link that is present between the digital media place-shifting device 104 and the management server 106. Depending upon the implementation, however, the connection mode capabilities data 402 may be indirectly received at the management server 106 using any number of data communication links, router elements, repeater elements, and/or other intermediary or interfacing devices or elements. This description assumes that the management server 106 successfully receives the connection mode capabilities data 402 from the digital media place-shifting device 104. As mentioned previously, the connection mode capabilities data 402 represents information for a plurality of different data communication modes, and the connection mode capabilities data 402 is related to certain data communication capabilities of the digital media place-shifting device 104. The management server 106 can save and maintain this connection mode capabilities data 402 (along with other connection mode capabilities data for any number of other digital media place-shifting devices, which are not shown in FIG. 4).

FIG. 4 depicts another preliminary task that may be performed with process 400. More particularly, the management server 106 may transmit or send connection mode priority data 404 to the digital media place-shifting device 104. This connection mode priority data 404 is related to the plurality of different data communication modes used by the system. As mentioned above, the connection mode priority data 404 might indicate a ranking, order of preference, or sequence of the different data communication modes. For this particular example, the connection mode priority data 404 is sent using a persistent data communication link that has been established between the digital media place-shifting device 104 and the management server 106. Depending upon the implementation, however, the connection mode priority data 404 may be indirectly received at the digital media place-shifting device 104 via any number of data communication links, router elements, repeater elements, and/or other intermediary or interfacing devices or elements. This description assumes that the digital media place-shifting device 104 successfully receives the connection mode priority data 404 from the management server 106. As mentioned previously, the connection mode priority data 404 represents information for a plurality of different data communication modes, and each mode may have an associated priority value, rank, number, or relative order. The digital media place-shifting device 104 can save and maintain this connection mode priority data 404 upon receipt.

In accordance with the exemplary embodiment described here, the digital media player device 102 requests and obtains the current connection mode capabilities data 402 and the current connection mode priority data 404 whenever the digital media player device 102 attempts to establish a data communication session with the digital media place-shifting device 104. In this regard, the digital media place-shifting device 104 may transmit or send the connection mode priority and capabilities data 406 to the digital media player device 102 in any suitable manner. For this example (where the digital media player device 102 and the digital media place-shifting device 104 are members of the same LAN), the digital media player device 102 can send an appropriate discovery request message to the digital media place-shifting device 104, which responds with a discovery response message. The discovery response message can contain at least some of the connection mode priority and capabilities data 406 and/or information derived from or otherwise based upon the connection mode priority and capabilities data 406. In certain embodiments, there may be only two data communication modes available to a LAN architecture (e.g., a TCP mode and a UDP mode). In such embodiments, the connection mode priority and capabilities data 406 may simply indicate whether or not one of the two modes is preferred over the other mode (or vice versa). In particular embodiments, a TCP mode and the data communication mode described in U.S. patent application Ser. No. 12/404,920, titled METHOD AND NODE FOR TRANSMITTING DATA OVER A COMMUNICATION NETWORK USING NEGATIVE ACKNOWLEDGMENT, are used with a LAN architecture. The relevant content of U.S. patent application Ser. No. 12/404,920 is incorporated by reference herein.

This description assumes that the digital media player device 102 successfully receives the connection mode priority and capabilities data 406 from the digital media place-shifting device 104. The digital media player device 102 can save and maintain this connection mode priority and capabilities data 406 upon receipt. The digital media player device 102 can use the connection mode priority and capabilities data 406 to determine, generate, or access a connection mode sequence for a plurality of different data communication modes that are supported by the digital media player device 102. The connection mode sequence represents a preferred order in which the different data communication modes will be used in an attempt to establish a data communication session with the digital media place-shifting device 104. Notably, the connection mode sequence is determined, generated, or resolved in a manner that is influenced or dictated by the connection mode capabilities data 402 and/or the connection mode priority data 404. Thus, the connection mode capabilities data 402 and/or the connection mode priority data 404 influence the manner in which the digital media player device 102 and the digital media place-shifting device 104 attempt to establish a data communication session using the plurality of different data communication modes.

After the digital media player device 102 has determined or obtained the desired connection mode sequence for the digital media place-shifting device 104, it attempts to establish a data communication session with the digital media place-shifting device 104, in accordance with the connection mode sequence. In practice, the digital media player device 102 will attempt to connect with the digital media place-shifting device 104, using different data communication modes if needed, until a successful data communication mode is identified and utilized. If for some reason none of the designated modes results in a successful data communication session, then the connection mode sequence could be repeated (any number of times) or the digital media player device 102 might terminate the connection routine without establishing a connection with the digital media place-shifting device 104. The exemplary routine depicted in FIG. 4 includes two attempted data communication sessions 408 that do not result in a successful connection. The third attempt, however, results in a successful data communication mode and a successful data communication session 410. At this point, data communication can be initiated, performed, and maintained between the digital media player device 102 and the digital media place-shifting device 104, using the successful data communication mode.

In practice, some or all of the data communication modes could be attempted or executed concurrently, which may be desirable to save time. As another example, the next communication mode could be initiated before the previously attempted communication mode has failed (i.e., while a communication session with a current communication mode is still being attempted). Such "overlapping" of the attempted sessions can be executed to reduce the overall time it takes to establish a successful connection.

In certain embodiments, the system can monitor and keep track of statistical data (empirical data) that is related to or otherwise associated with attempted or successful data communication sessions between the digital media player device 102 and the digital media place-shifting device 104. For this particular embodiment, the digital media player device 102 collects and maintains this statistical data 412, and transmits or sends the statistical data 412 to the administrator system 108 at an appropriate time (preferably, during or after the successful data communication session 410). Alternatively, the digital media place-shifting device 104 might collect some or all of the statistical data 412 and transmit or send the statistical data 412 to the administrator system 108. The statistical data 412 may include or convey different types of information, including, without limitation: the connection success and/or failure rate for each of the different data communication modes; the total number of connections established for each of the different data communication modes; the total number of failed connections for each of the different data communication modes; a quality metric that indicates one or more performance characteristics of each of the different data communication modes; the amount of time taken to detect failure and success of the attempted communication modes (each mode may have its own statistical log associated therewith); or the like.

For this particular example, the statistical data 412 is sent using a persistent data communication link that has been established between the digital media player device 102 and the administrator system 108. Depending upon the implementation, however, the statistical data 412 may be indirectly received at the administrator system 108 via any number of data communication links, router elements, repeater elements, and/or other intermediary or interfacing devices or elements. This description assumes that the administrator system 108 successfully receives the statistical data 412 from the digital media player device 102. The administrator system 108 can then process the statistical data 412 and generate updated connection mode priority data 414 as needed (in practice, such processing by the administrator system 108 could be fully automated and computer-based, partially automated, fully or partially dependent on manual activity, or the like). In this regard, the updated connection mode priority data 414 might be influenced by statistical data related to attempted and/or successful data communication sessions between the digital media player device 102 and the digital media place-shifting device 104.

After producing the updated connection mode priority data 414, the administrator system 108 may transmit or send the updated connection mode priority data 414 to the management server 106. For this particular example, the updated connection mode priority data 414 is sent using a persistent data communication link that has been established between the administrator system 108 and the management server 106. Depending upon the implementation, however, the updated connection mode priority data 414 may be indirectly received at the management server 106 via any number of data communication links, router elements, repeater elements, and/or other intermediary or interfacing devices or elements. This description assumes that the management server 106 successfully obtains the updated connection mode priority data 414 from the administrator system 108. The management server 106 can save and maintain this updated connection mode priority data 414 upon receipt and send the updated connection mode priority data 414 to the digital media place-shifting device 104 at an appropriate time such that subsequent iterations of the process 400 will be performed with the updated connection mode priority data 414 in mind.

Figure 5:
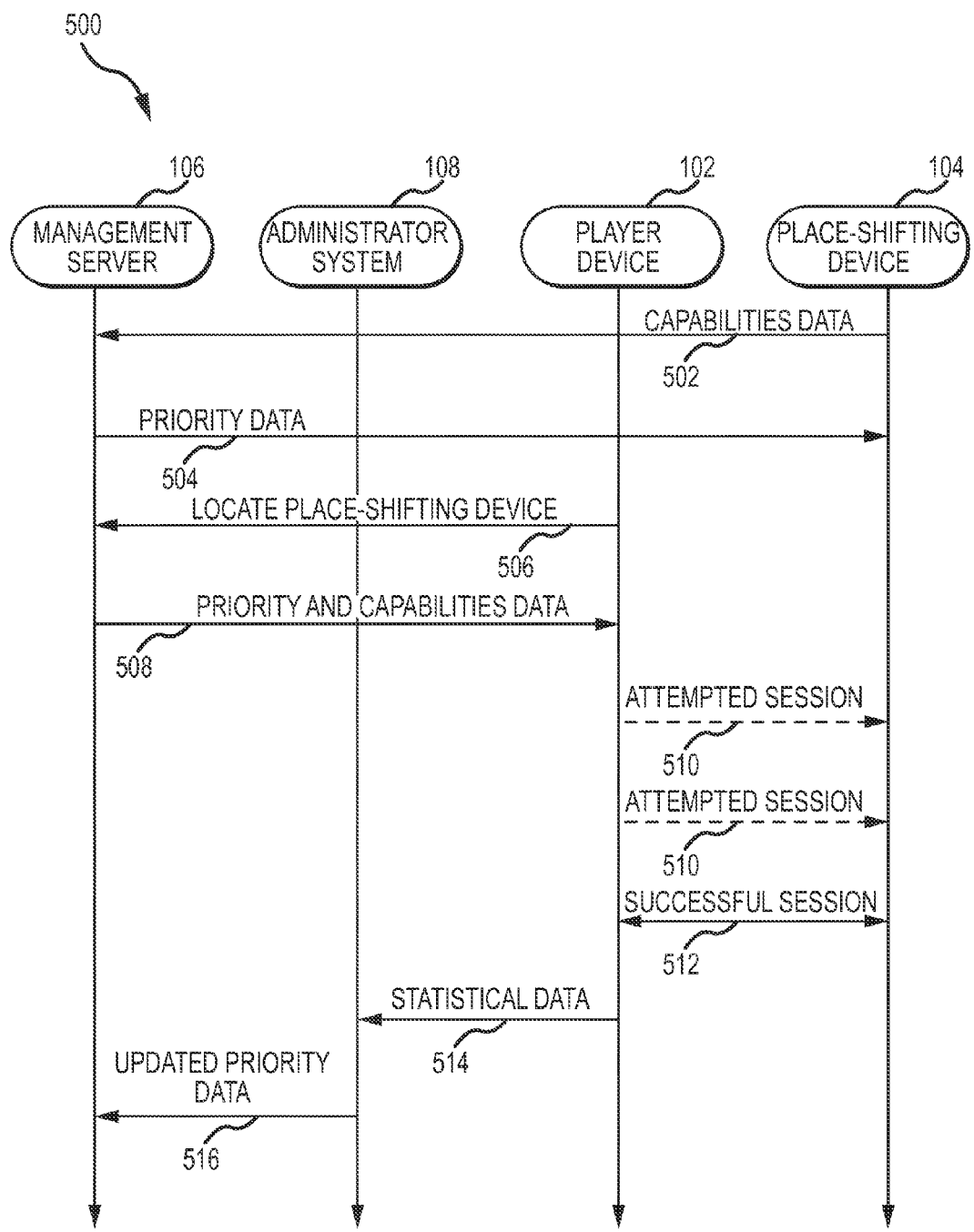
FIG. 5 is a flow diagram that illustrates another exemplary embodiment of a process for coordinating data communication between two devices.

FIG. 5 is a flow diagram that illustrates another exemplary embodiment of a process 500 for coordinating data communication between two devices. For this flow diagram, the downward direction represents increasing time. The various tasks performed in connection with process 500 may be performed by software, hardware, firmware, or any combination thereof. For illustrative purposes, the following description of process 500 may refer to elements mentioned above in connection with FIGS. 1-3. In practice, portions of process 500 may be performed by different elements of the described system, e.g., the management server 106, the administrator system 108, the digital media player device 102, or the digital media place-shifting device 104. It should be appreciated that process 500 may include any number of additional or alternative tasks, the tasks shown in FIG. 5 need not be performed in the illustrated order, and process 500 may be incorporated into a more comprehensive procedure or process having additional functionality not described in detail herein. Moreover, one or more of the tasks shown in FIG. 5 could be omitted from an embodiment of the process 500 as long as the intended overall functionality remains intact.

The process 500 illustrated in FIG. 5 is performed when the digital media player device 102 is communicatively coupled to the digital media place-shifting device 104 via a WAN architecture. When connected using a WAN architecture, some data communication modes might be preferred over other modes, and/or some data communication modes might be unavailable (although reserved for use with other system or network architectures). Moreover, a WAN architecture can be used to support "out-of-home" data communication sessions between the digital media place-shifting device 104 (which is typically located in a stationary location) and a remote or portable digital media player device 102. Referring again to FIG. 1, a data communication mode utilized with a WAN architecture might rely on the messaging server 110, which may be suitably configured to function as a relay or intermediary server between the digital media player device 102 and the digital media place-shifting device 104. In such situations, data connectivity between the messaging server 110 and the digital media place-shifting device 104 is maintained to communicate data to and from the digital media player device 102 via the messaging server 110. Accordingly, if the digital media place-shifting device 104 is disconnected from the messaging server 110, then its connection mode capabilities data (for those data communication modes that rely on connectivity with the messaging server 110) will reflect the disconnected status.

In particular embodiments, the system 100 can utilize a basic relay mode that involves the messaging server 110 when the digital media player device 102 and the digital media place-shifting device 104 communicate using a WAN architecture. In addition, the data communication mode described in U.S. patent application Ser. No. 12/405,039, titled MEDIATED NETWORK ADDRESS TRANSLATION TRAVERSAL, could be used with a WAN architecture. The relevant content of U.S. patent application Ser. No. 12/405,039 is incorporated by reference herein.

Referring again to FIG. 5, the process 500 may begin with one or more preliminary or setup tasks, which were described above for the process 400. In this regard, the digital media place-shifting device 104 may transmit or send its connection mode capabilities data 502 to the management server 106, and the management server 106 may transmit or send the connection mode priority data 504 to the digital media place-shifting device 104.

In accordance with the exemplary embodiment described here, the digital media player device 102 initially communicates with the management server 106 whenever the digital media player device 102 attempts to establish a data communication session with the digital media place-shifting device 104. In this regard, the digital media player device 102 may transmit or send a lookup request 506 to the management server 106 in any suitable manner. The lookup request 506 represents a command or an instruction to locate or identify the particular digital media place-shifting device 104. This lookup request 506 may be needed in system embodiments that utilize unique identifiers for digital media place-shifting devices, where the unique identifiers can be mapped to dynamic network addresses or other dynamic identifiers of the digital media place-shifting devices. In other words, the management server 106 can employ these unique identifiers to monitor the current network location of the digital media place-shifting device 104 (and other place-shifting devices if necessary) on behalf of the digital media player device 102. Thus, the digital media player device 102 can identify the digital media place-shifting device 104 by sending the unique identifier of the digital media place-shifting device 104 to the management server 106, along with the lookup request 506.

The management server 106 can process the lookup request and the unique identifier (if needed) to determine or identify the particular digital media place-shifting device 104 with which the digital media player device 102 intends to communicate. Once the management server 106 identifies the digital media place-shifting device 104, it retrieves or otherwise obtains the connection mode priority and capabilities data 508 for the identified digital media place-shifting device 104 (along with the network address and port number of the digital media place-shifting device 104, which is provided to the digital media player device 102). As explained above with reference to FIG. 2, the management server 106 may include or cooperate with a suitable amount of memory that can be used to store and maintain the current connection mode priority and capabilities data 508 for the digital media place-shifting device 104 (and other place-shifting devices if needed). The management server 106 can transmit or send the connection mode priority and capabilities data 508 to the digital media player device 102 using any suitable methodology. For this particular example, the connection mode priority and capabilities data 508 is sent using a persistent data communication link that has been established between the management server 106 and the digital media player device 102. Depending upon the implementation, however, the connection mode priority and capabilities data 508 may be indirectly received at the digital media player device 102 via any number of data communication links, router elements, repeater elements, and/or other intermediary or interfacing devices or elements.

This description assumes that the digital media player device 102 successfully receives the connection mode priority and capabilities data 508 from the management server 106. The digital media player device 102 can save and maintain this connection mode priority and capabilities data 508 upon receipt. Thereafter, the remainder of process 500 is similar to that described above for process 400. For this reason, the remainder of process 500 will not be described in detail here. For this example, the digital media player device 102 determines the desired connection mode sequence and attempts to establish a data communication session with the digital media place-shifting device 104, in accordance with the connection mode sequence. FIG. 5 depicts a scenario where two attempted data communication sessions 510 do not result in a successful connection, while the third attempt results in a successful data communication mode and a successful data communication session 512.

FIG. 5 also depicts a situation where the digital media player device 102 collects and maintains statistical data 514, and transmits or sends the statistical data 514 to the administrator system 108. As described above, the statistical data 514 is used to generate updated connection mode priority data 516 if needed, and the updated connection mode priority data 516 can be sent to the management server 106 for maintenance and further handling as needed.

As mentioned previously with reference to FIG. 4, the connection mode priority data may be dynamic in nature and the system can be updated in an ongoing manner to reflect changing priority schemes. For instance, as more performance parameters are gathered for a given digital media place-shifting device, the connection mode priority data and/ or the connection mode sequence could be dynamically updated using the statistical data mentioned above. Alternatively or additionally, the connection mode priority data and/or the connection mode sequence could be dynamically updated based upon one or more of the following items, without limitation: the network address (or location) of the digital media player device; the type, category, or classification of the digital media player device; the network address (or location) of the digital media place-shifting device; the type, category, or classification of the digital media place-shifting device; revision, update, or other historical information associated with the digital media player device; revision, update, or other historical information associated with the digital media place-shifting device; etc. As mentioned above, the digital media player device 102 can report relevant information to the administrator system 108 and/or to the management server 106 for each connection attempt (whether or not successful), to enable the administrator system 108 and/or the management server 106 to modify the connection mode priority data in response to such information.

The system 100 may employ a suitably configured connection manager to provide certain services and features related to connection mode priority. In practice, the connection manager could be implemented or realized with the administrator system 108, the management server 106, the messaging server 110, and/or elsewhere in the system 100. The connection manager includes or cooperates with processing logic that facilitates the management, revision, updating, and handling of connection mode priority data for one or more devices in the system 100. In certain embodiments, the connection manager can be implemented as an enterprise application having various services, at least one database, and a user interface (e.g., a web interface). A web interface can be employed to provide an interactive console to an operator, and the console may be used to manage digital media place-shifting devices by their unique identifiers, by their user identifiers, by their network addresses, by group identifiers, etc.

The database for the connection manager may include data associated with connection mode priority profiles, devices, device groups, and the like. The priority profiles specify the connection mode priority data for the different data communication modes, and a priority profile could be applied to an individual device or to a device group. Referring to FIG. 1, the management server 106 could interface with the connection manager to obtain the connection mode priority data for any particular digital media place-shifting device. The business logic related to connection mode priorities could be implemented in the connection manager.

The connection manager may be responsible for creating and maintaining the priority profiles for the digital media place-shifting devices, as described above. Again, the connection mode priority data for a given place-shifting device may be static (e.g., selected and explicitly specified by the system administrator) or dynamic. The connection manager may also be responsible for creating period profiles, which specify the day/time of activity. Period profiles, along with priority profiles, can be used to define the actual connection priority for any device group or individual device at any particular time.

The connection manager could also be used to create device groups, each of which may have any number (including zero) of digital media place-shifting devices. In certain implementations, device groups can be created using the "finder identifiers" or any unique identifiers of the place-shifting devices. The priority profiles and the period profiles can be applied to device groups to determine connection priority for any particular device group at a particular time/day. Thus, different Multiple System Operators (MSOs) or service providers can assign their digital media place-shifting devices under different groups managed by their individual administrators.

The connection manager may be used to view the statistics of a particular digital media place-shifting device or a device group, e.g., connections modes attempted, success rate, or the like. In this regard, the connection manager could be used to modify the connection mode priority data for individual devices and/or device groups, as described above with reference to FIG. 4. In addition, the user interface of the connection manager could be used to view: the current connection modes of a particular digital media place-shifting device; the success/failure rate (as a table or plot) of each data communication mode; the success/failure rate of each priority profile; the success/failure rate of the system as a whole; the success/failure rate of a device group; the success/failure rate of an individual device; etc.

In certain embodiments, alarms can be generated if the success rate for a particular group falls below a threshold level. These alarms could be used to notify group administrators and/or to automatically change the connection mode priority data for that group.

The connection manager could also be used to maintain and manage cost profiles. Such cost profiles could be used to specify the cost for different data communication modes or connection types, and can be applied to different device groups for different periods. Moreover, the connection manager could analyze and process the cost profiles and generate billing reports as needed.

The techniques and technologies described here facilitate the efficient and effective initiation of data communication between two devices, e.g., a digital media player device and a digital media place-shifting device. The methodologies described above are particularly suitable when the two devices support multiple connection modes. In such systems, while attempting to connect to the digital media place-shifting device, the digital media player device will begin with one of the connection modes and proceed until a successful data communication session is established. The techniques and technologies described here enable the digital media player device to create and use an appropriate connection mode sequence to establish the data communication session. This approach results in higher connection success rates and, therefore, shorter connection establishment times. This approach may also result in higher data throughput, due to the designation of preferred connection modes over less preferred connection modes.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for coordinating data communication between a digital media player device and a digital media place-shifting device, the method comprising:

receiving, at a server device, connection mode capabilities data for a plurality of different data communication modes, the connection mode capabilities data being related to data communication capabilities of the digital media place-shifting device;

sending, from the server device to the digital media place-shifting device, connection mode priority data for the plurality of different data communication modes, the connection mode priority data indicating a ranking of the plurality of different data communication modes;

thereafter, sending the connection mode capabilities data and the connection mode priority data from the digital media place-shifting device to the digital media player device;

determining, with the digital media player device, a connection mode sequence that includes a plurality of different data communication modes supported by the digital media player device, wherein the determining is influenced by the connection mode capabilities data and the connection mode priority data;

attempting to establish a data communication session between the digital media player device and the digital media place-shifting device using at least two of the plurality of different data communication modes, and in accordance with the determined connection mode sequence, until a successful data communication mode is identified; and thereafter, performing data communication between the digital media player device and the digital media place-shifting device, using the identified successful data communication mode.

2. The method of claim 1, wherein the connection mode capabilities data comprises information selected from the group consisting of: an indication that a data communication mode is not supported; an indication that a data communication mode is supported but failed at setup of the digital media place-shifting device; an indication that a data communication mode has not been tested; and an indication that a data communication mode has been tested and has passed.

3. The method of claim 1, further comprising:
  obtaining updated connection mode priority data at the server device; and
  maintaining the updated connection mode priority data at the server device.

4. The method of claim 3, wherein the updated connection mode priority data is influenced by statistical data related to attempted or successful data communication sessions between the digital media player device and the digital media place-shifting device.

* * * * *